Dec. 21, 1965   A. V. SCOLLARD ETAL   3,224,579
EGG HANDLING, SORTING AND PACKING APPARATUS
Filed March 2, 1962   18 Sheets-Sheet 2

INVENTORS
Alvoid V. Scollard
Alfred E. Comstock
BY
Attorneys

INVENTORS
Alvoid V. Scollard
Alfred E. Comstock
Attorneys

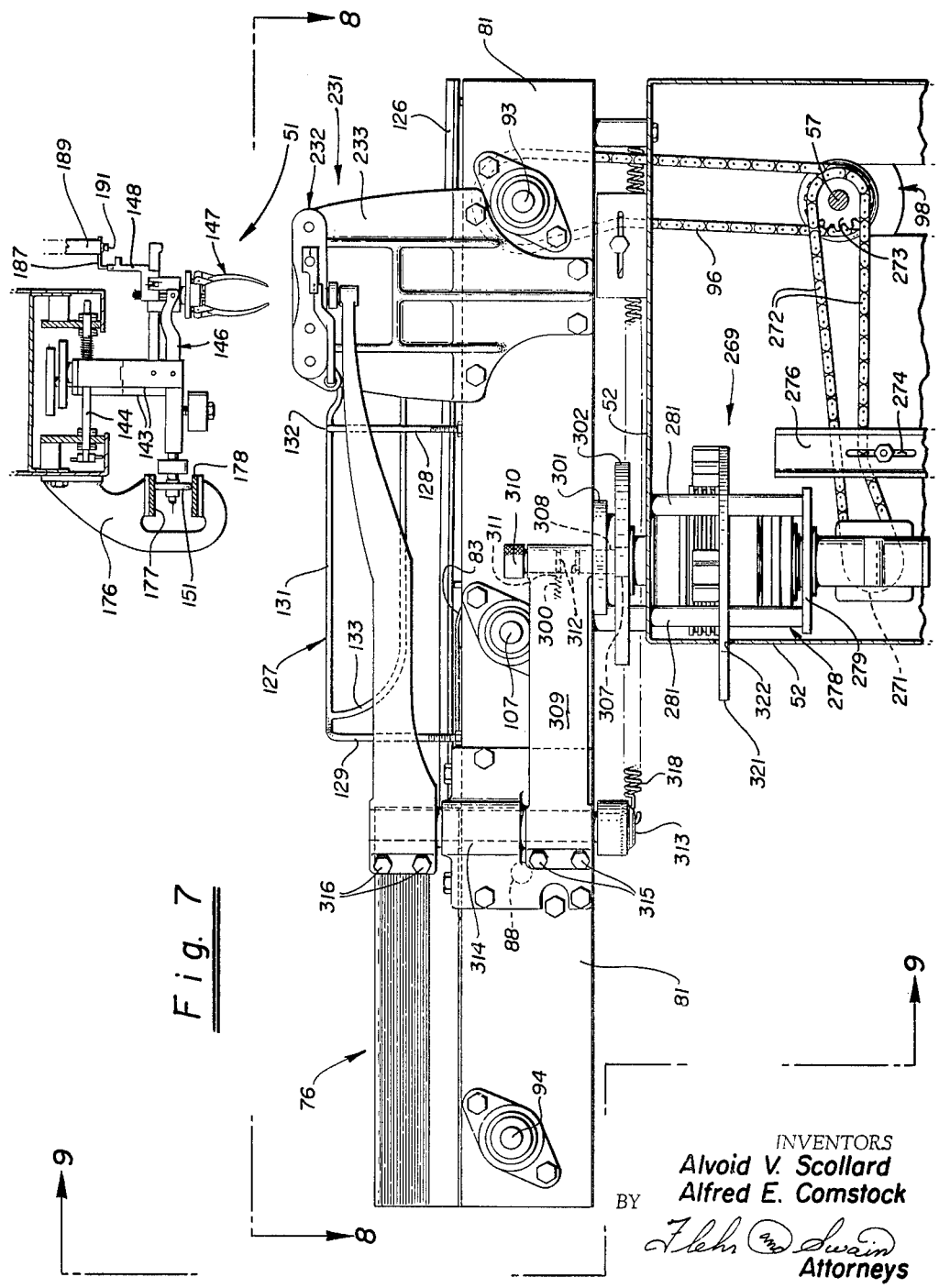

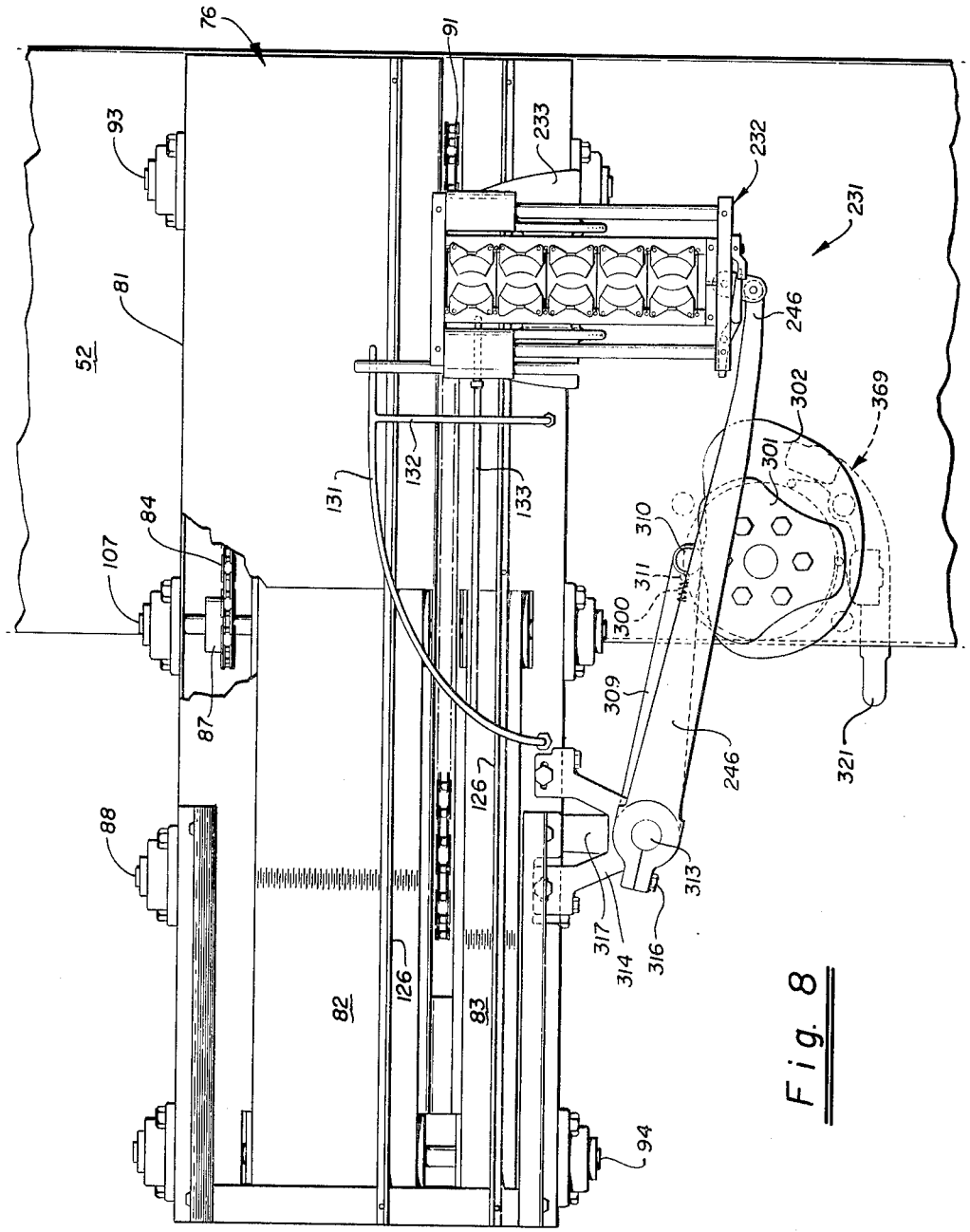

Dec. 21, 1965  A. V. SCOLLARD ETAL  3,224,579
EGG HANDLING, SORTING AND PACKING APPARATUS
Filed March 2, 1962  18 Sheets-Sheet 7

INVENTORS
Alvoid V. Scollard
Alfred E. Comstock
BY
Attorneys

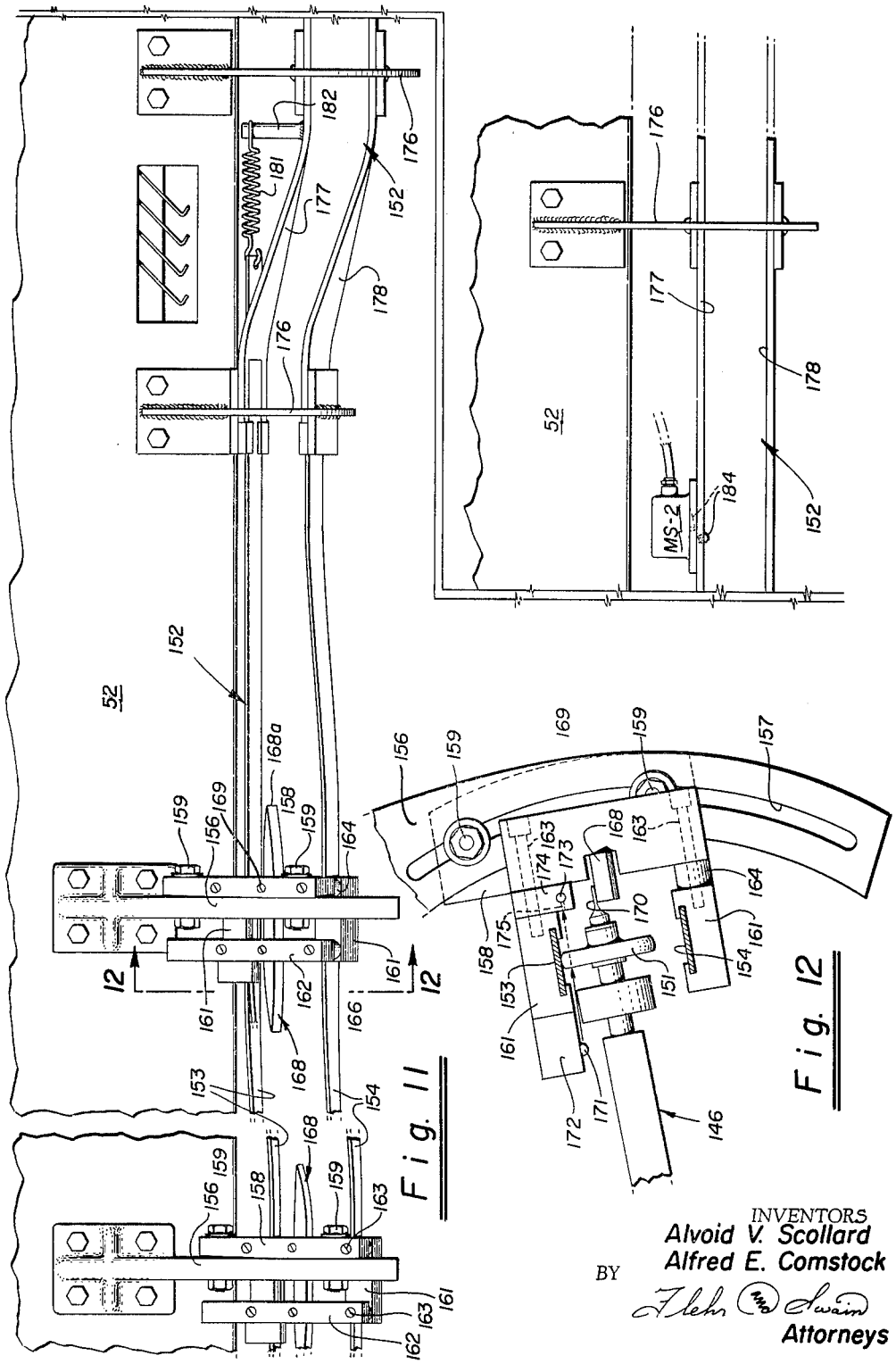

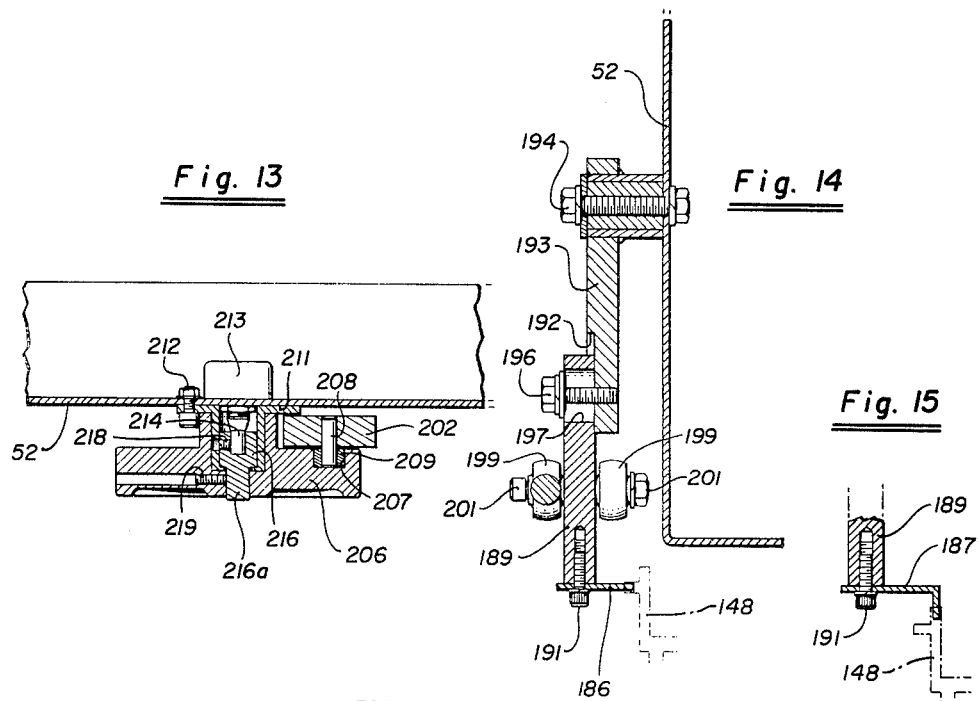
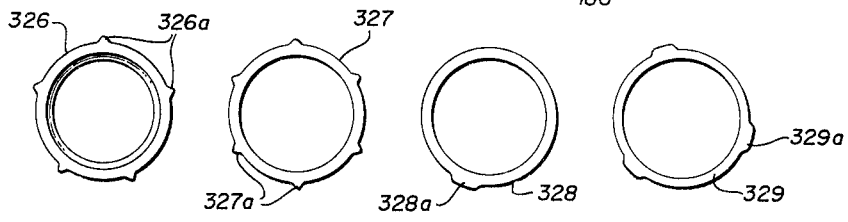
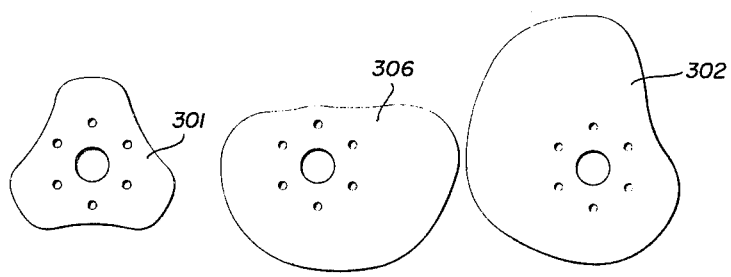

Dec. 21, 1965  A. V. SCOLLARD ETAL  3,224,579
EGG HANDLING, SORTING AND PACKING APPARATUS
Filed March 2, 1962  18 Sheets-Sheet 10
*Fig. 16*
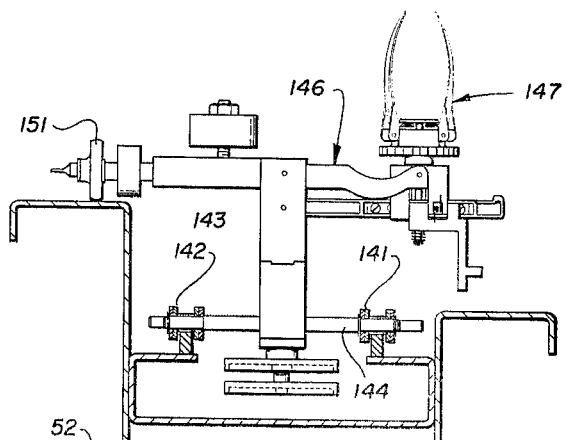
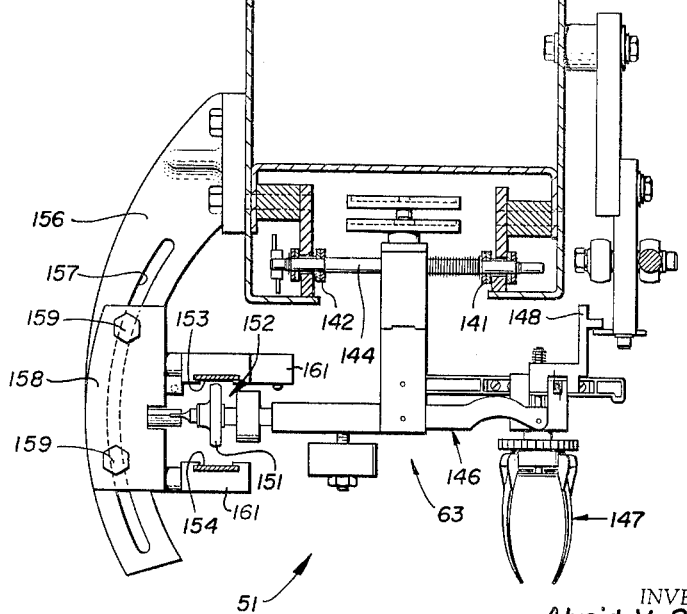
INVENTORS
Alvoid V. Scollard
Alfred E. Comstock
BY
*Flehr and Swain*
Attorneys Dec. 21, 1965   A. V. SCOLLARD ETAL   3,224,579
EGG HANDLING, SORTING AND PACKING APPARATUS
Filed March 2, 1962   18 Sheets-Sheet 11

INVENTORS
Alvoid V. Scollard
BY  Alfred E. Comstock

Flehr and Swain
Attorneys

INVENTORS
Alvoid V. Scollard
Alfred E. Comstock
BY
Attorneys

INVENTORS
Alvoid V. Scollard
Alfred E. Comstock
BY
Flehr and Swain
Attorneys

INVENTORS
Alvoid V. Scollard
Alfred E. Comstock
BY
Attorneys

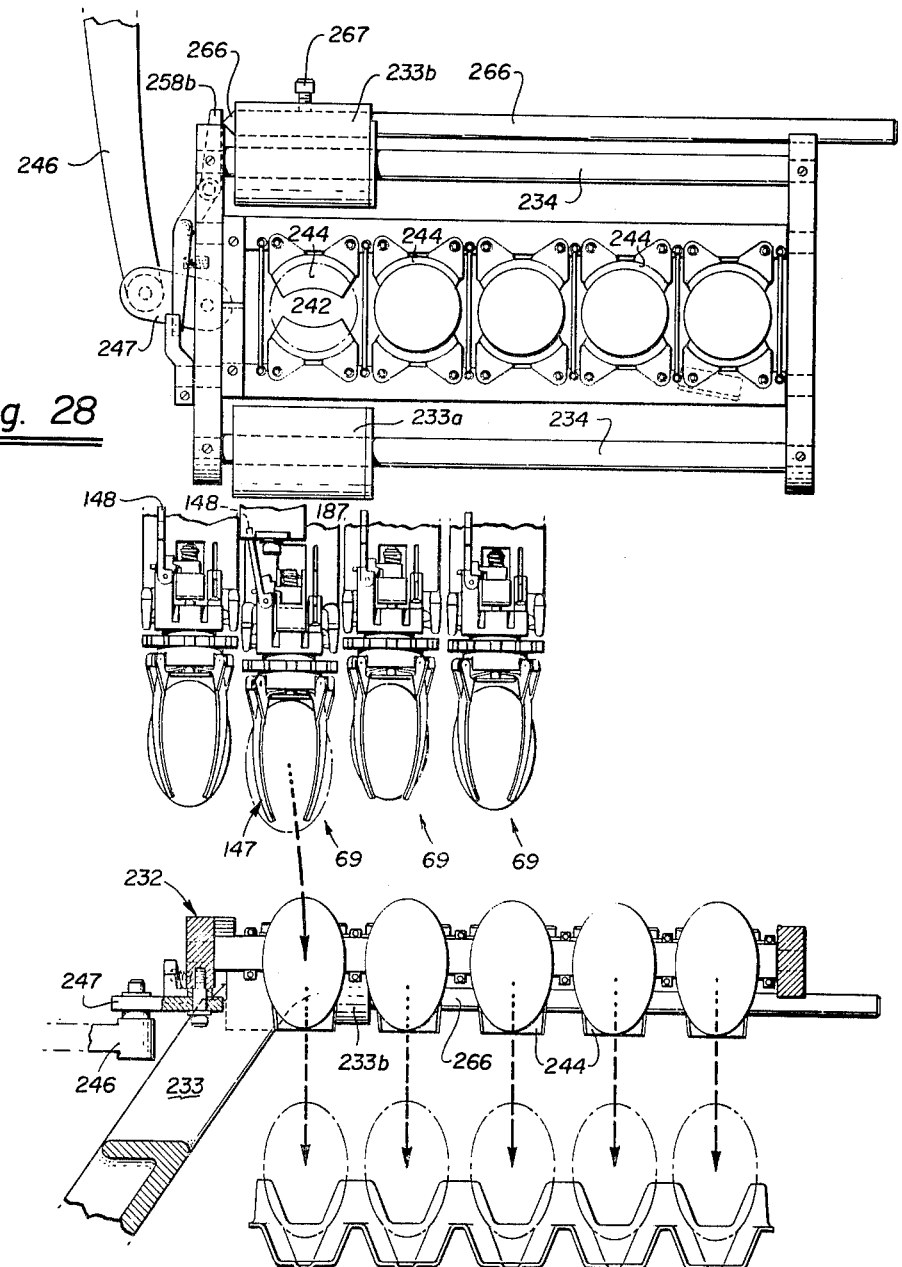

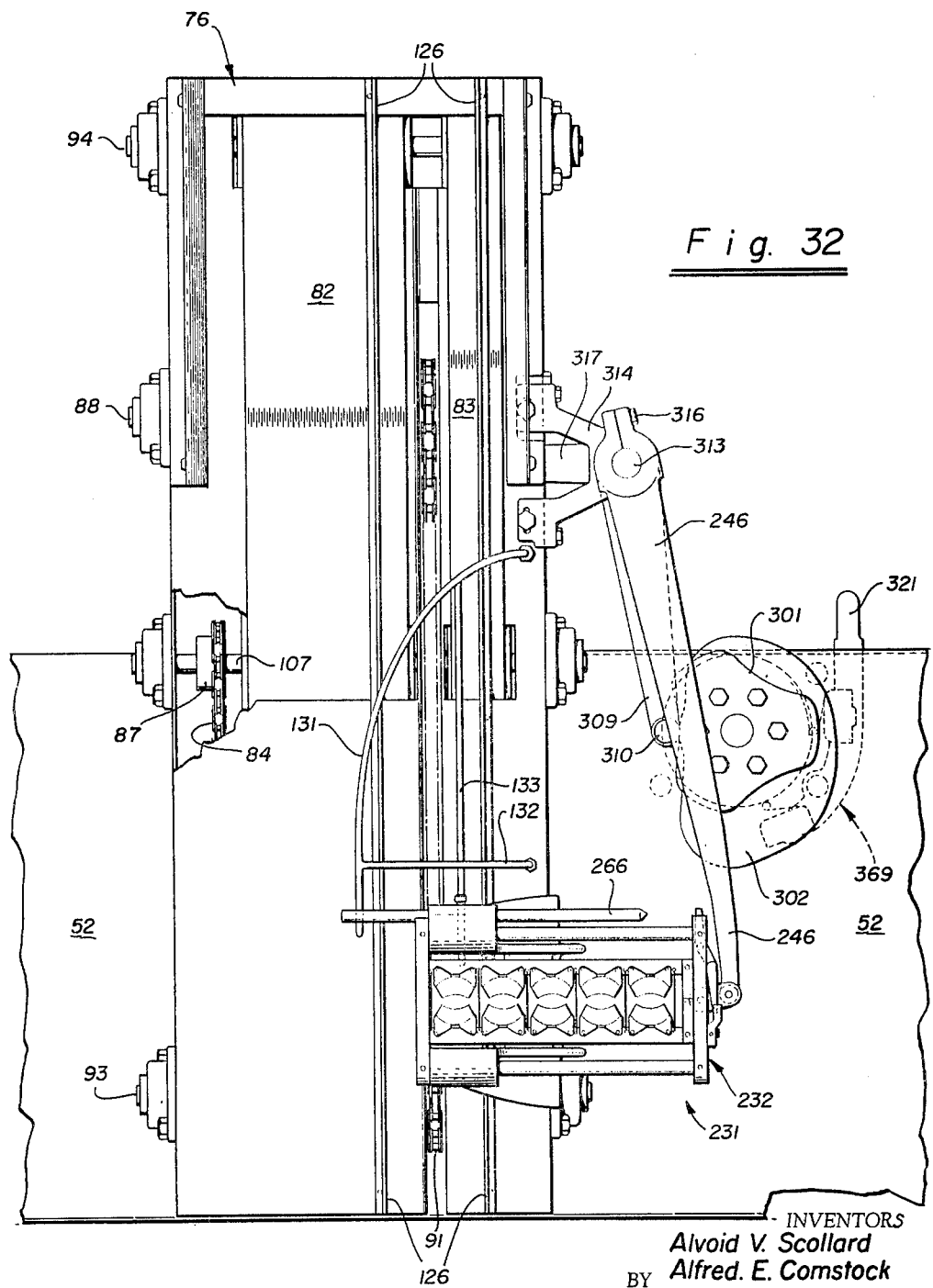

INVENTORS
Alvoid V. Scollard
Alfred E. Comstock
BY
Attorneys

United States Patent Office 3,224,579
Patented Dec. 21, 1965

3,224,579
EGG HANDLING, SORTING AND PACKING
APPARATUS
Alvoid V. Scollard, Orinda, and Alfred E. Comstock, Greenbrae, Calif., assignors to Safeway Stores, Incorporated, Oakland, Calif., a corporation of Maryland
Filed Mar. 2, 1962, Ser. No. 177,071
16 Claims. (Cl. 209—74)

This invention relates to handling, sorting and packing apparatus, and more particularly to apparatus which will facilitate the handling, sorting and packing of eggs in different quality and weight classifications.

Apparatus heretofore provided for the handling, sorting and packing of eggs have had several disadvantages and also have lacked certain desirable features. For example, in certain machines, the eggs at times strike one another during the time they are being dropped into the trays or cartons in which the eggs are being packed which often causes breakage of the eggs. Also, it has been found that when the eggs are deposited from a moving conveyor or the like, the trajectory of the egg varies greatly in accordance with the speed of travel of the conveyor, making it difficult to deposit the eggs into predetermined positions in the trays or cartons at other than one speed of travel of the conveyor. When the speed of the conveyor is changed, it has been found that the eggs may strike one another and actually may miss the pockets into which they are to be deposited. There is, therefore, a need for apparatus which will overcome the above named disadvantages.

In general, it is an object of the present invention to provide egg handling, sorting and packing apparatus which facilitates the handling, sorting and packing of articles and particularly rather fragile articles such as eggs.

Another object of the invention is to provide apparatus of the above character in which mechanically positioned means is utilized for causing articles or eggs to be discharged at stations in accordance with their weight.

Another object of the invention is to provide apparatus of the above character in which an accumulator is utilized for receiving and collecting or accumulating the articles discharged from a conveyor and in which the articles are thereafter directly positioned in trays, cartons or other containers from the accumulator when the accumulator is in a stationary position.

Another object of the invention is to provide apparatus of the above character in which the articles can be deposited in the accumulator, either concurrent or countercurrent to the direction of travel of the conveyor.

Another object of the invention is to provide apparatus of the above character in which the accumulator accumulates a sufficient number of articles to fill a complete row in the carton or tray or other container in which the articles are being packed.

Another object of the invention is to provide apparatus of the above character in which the articles are released by the accumulator so that they will fall directly into the tray, carton or other container into which the articles are being packed.

Another object of the invention is to provide apparatus of the above character in which means is provided for compensating for the change in trajectory of the articles as they are discharged from the conveyor to compensate for changes in speed of the conveyor.

Another object of the invention is to provide apparatus of the above character in which the means for compensating for the change in trajectory of the articles in all the stations can be controlled from a single point.

Another object of the invention is to provide apparatus of the above character in which the articles are dropped directly downwardly from the accumulator so that the articles can be accurately positioned to thereby eliminate any chance that the articles may bump into each other as they are dropped into the container.

Another object of the invention is to provide apparatus of the above character in which the accumulator is provided with special article receiving pockets for receiving relatively fragile articles such as eggs without danger of breaking the same.

Another object of the invention is to provide apparatus of the above character in which the number of articles or eggs accumulated by the accumulator before discharge can be readily changed.

Another object of the invention is to provide apparatus of the above character in which an accumulator is provided in each of certain grade and weight stations with the individual article receiving pockets of the accumulator for each station receiving all of the articles of one weight or grade classification so that these articles can be subsequently discharged in that station.

Another object of the invention is to provide apparatus of the above character in which relatively simple means is provided for counting the eggs or articles discharged in each station.

Another object of the invention is to provide apparatus of the above character in which the articles or eggs accumulated by the accumulator can be deposited in various types of containers.

Additional objects and features of the invention will appear from the following description in which the preferred embodiments have been set forth in detail in conjunction with the accompanying drawings.

Referring to the drawings:

FIGURE 7 is a cross-sectional view taken along the line 7—7 of FIGURE 3.

FIGURE 8 is a top plan view looking along the line 8—8 of FIGURE 7.

FIGURE 11 is an enlarged detail view of portions of the cam track in one of the commercial stations and a pair of the weighing stations.

FIGURE 12 is an enlarged detail view taken along the line 12—12 of FIGURE 11 and shows the photoelectric sensing means used in the weight stations.

FIGURE 13 is a cross-sectional view taken along the line 13—13 of FIGURE 3.

FIGURE 14 is a cross-sectional view taken along the line 14—14 of FIGURE 3.

FIGURE 15 is a cross-sectional view taken along the line 15—15 of one of the weight stations.

FIGURE 16 is an enlarged detail view, partially in cross-section, showing the type of mechanical trip provided in the weight stations.

FIGURE 27 is a view similar to FIGURE 26 showing the accumulator receiving five eggs or articles before they are discharged by the accumulator into the carton or tray below.

FIGURE 28 is a top plan view of the accumulator shown in FIGURE 27.

FIGURE 29 is a plan view of the two-drop cam utilized in the accumulator assembly shown in FIGURE 17.

FIGURES 30A and 30B show the four-drop and five-drop cams, respectively, for the accumulator assembly.

FIGURES 31A, 31B, 31C and 31D show the cams utilized in the accumulator assembly shown in FIGURE 17.

FIGURE 32 is a view similar to FIGURE 8 but shows the accumulator arranged in such a manner that the eggs are deposited in the accumulator in a direction which is concurrent to the direction of travel of the conveyor rather than countercurrent to the direction of travel of the conveyor as shown in FIGURE 8.

Figure 1:
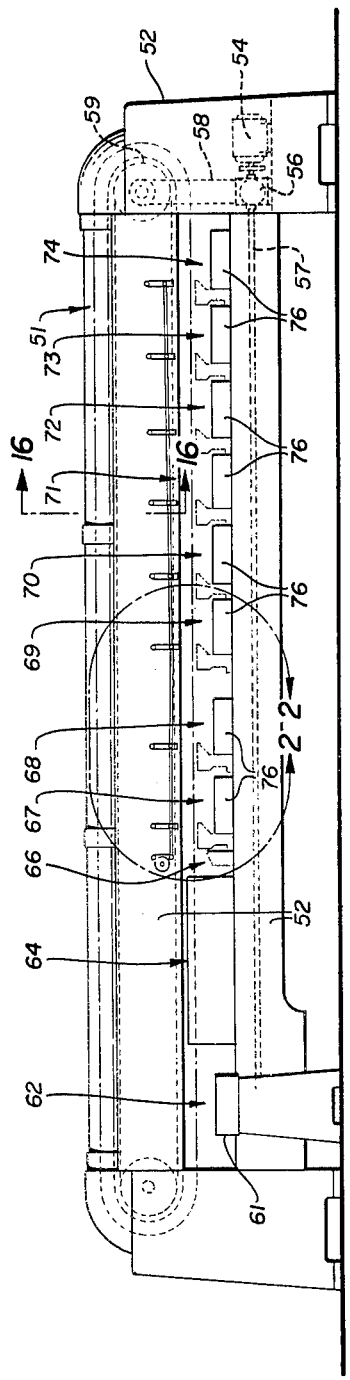
FIGURE 1 is a side elevational view of an egg handling, sorting and packing apparatus incorporating our invention.

A general overall view of our egg handling, sorting and packing apparatus is shown in FIGURE 1. It consists of an endless transport or conveyor assembly 51 which is mounted upon a frame 52 in a manner described in our copending application Serial No. 89,275, filed February 14, 1961. The drive means for the transport or conveyor assembly 51 has been shifted from the front end to the rear end of the apparatus so that the lower run of the endless chain is pulled rather than pushed as with the drive in the above identified application. The drive means consists of a suitable variable speed drive motor 54 such as the "Adjusto-Speed" manufactured by the Dynamic Division of the Eaton Manufacturing Co. of Kenosha, Wisconsin. This variable speed drive motor 54 drives a speed reducer 56 which has two output shafts, one of which drives a shaft 57 extending longitudinally of the apparatus for a purpose hereinafter described, and the other of which drives a chain 58 which drives one of the sprocket wheels 59 upon which the endless conveyor assembly 51 is mounted.

The articles which are to be handled by the apparatus are supplied to the endless transport or conveyor assembly 51 by a feed-in conveyor 61 which is of a type described in our copending application Serial No. 89,275, filed February 14, 1961. For example, as explained in our copending application, the articles can take the form of eggs which are supplied on the feed-in conveyor 61 in flats or trays and are advanced to an egg pick-up station 62.

As also explained in our copending application Serial No. 89,275, filed February 14, 1961, the transport or conveyor assembly 51 consists of a plurality of articles carrying devices 63 which also can be called scale beam assemblies. The articles, which can be eggs, are supplied by the feed-in conveyor to the article carrying devices in the pick-up station 62. The articles or eggs are supplied in rows to the article carrying devices 63 during the time that the article carrying devices are moving. The eggs or articles, after they have been picked up, pass through a plurality of grading and sorting stations. Thus, assuming that eggs are being handled, the eggs first pass through a candling station 64, then through a blood drop station 66, two commercial stations 67 and 68, and thence through six sorting or weight stations which can be identified as a jumbo station 69, an extra-large station 70, a large station 71, a medium station 72, a small station 73, and a pewee station 74. The eggs which are discharged in the two commercial stations and the six weight stations are discharged into containers which are carried by stub conveyors 76 of a type described in our copending application Serial No. 89,275, filed February 14, 1961, and also described hereinafter.

Each of the stub conveyors consists of a rectangular elongate framework 81 which is mounted upon the main framework 52. The stub conveyors include a pair of belts 82 and 83, with belt 82 being a relatively wide belt and with belt 83 being a relatively narrow belt. Both of the belts 82 and 83 are driven continuously by a chain 84 (see FIGURES 3 and 4). The chain 84 is driven by a sprocket 86 which is affixed to the shaft 57. The chain 84 drives a sprocket 87 which is affixed to a shaft 88. The shaft 88 carries a drum 89 on which the belts 82 and 83 are mounted. The belts 82 and 83 are thus driven continuously and are provided for continuously delivering cartons, trays and the like from carton set-up machines (not shown) or other container supplying means.

Means is provided for controlling the advance of the cartons, trays or other containers on the belts 82 and 83 and consists of an endless conveyor chain 91 which is mounted on a pair of sprocket wheels 92. The sprocket wheels 92 are mounted on shafts 93 and 94 and are positioned so that the conveyor chain 91 travels in a direction parallel to and between the belts 82 and 83 as shown particularly in FIGURE 8. As hereinafter described, the conveyor chain 91 serves as an index conveyor and is provided with lugs or pushers 95 which extend outwardly from the conveyor chain and above the conveyor belts 82 and 83 as shown particularly in FIGURE 4. The chain 84 is guided by idler sprockets 90 so that the chain 84 will clear certain portions of the apparatus without any difficulty. Means is provided for driving the index conveyor chain 91 and consists of a chain 96 (see FIGURE 3). The chain 96 is driven by a sprocket wheel as shown. This sprocket wheel is connected to an electric brake and clutch assembly 98 of the type which is manufactured by Warner Electric Brake and Clutch Co. of Beloit, Wisconsin. The brake and clutch assembly 98 is mounted on the shaft 57 and is driven by the shaft 57. The shaft 57 on which the clutch is mounted extends through the clutch and rotates continuously. The magnetic clutch includes a wiper assembly 99 which is utilized for supplying power to the slip rings of the brake and clutch assembly 98. As described in our copending application Serial No. 89,275, filed February 14, 1961, the brake and clutch assembly is constructed so that when the clutch magnet is energized, the chain 96 is driven. The chain 96 drives a sprocket 101 which is affixed to the shaft 93 and thus drives the index conveyor chain 91 at the time the brake and clutch assembly 98 is energized.

Figure 5:
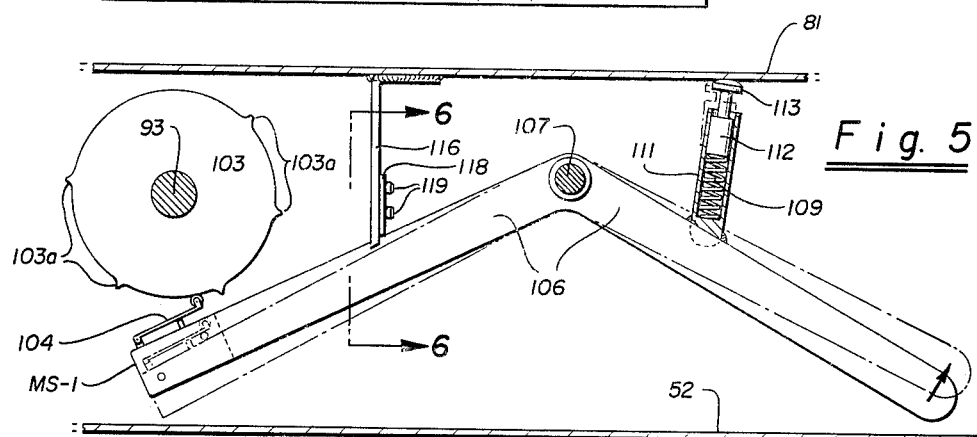
FIGURE 5 is an enlarged detail view of the means provided for shifting the microswitch for controlling the advance of the containers on the conveyor.

Means is provided, as hereinafter described, for energizing and deenergizing the brake and clutch assembly 98 at predetermined times. This means includes a cam hub 102 which is affixed to the shaft 93 and is driven thereby. Mounted on the cam 102 are a plurality of cam surfaces 103 which have raised portions 103a. As explained in our copending application Serial No. 89,275, filed February 14, 1961, a plurality of cam surfaces are provided so that the stub conveyor 76 can be utilized with a number of different types of article-receiving containers. For example, one of the cam surfaces could be provided for packing the articles such as eggs in trays, "Tri-Strut" cartons, "Case-Ace" cartons, "Hi-Vee" visible cartons, etc. The cam surfaces 103 are adapted to be engaged by a cam follower 104 which forms a part of a microswitch MS-1. The microswitch MS-1 is mounted on a bell crank or L-shaped arm 106 which is pivotally and slidably mounted on a rod 107. Means is provided for yieldably urging the end of the arm 106 carrying the microswitch MS-1 towards the cam surfaces 103 and consists of a spring 109 which is mounted in a sleeve 111 affixed to the upper end of the arm 106 as shown particularly in FIGURE 5. A follower 112 is mounted within the sleeve 111 and engages one end of the spring 109. The follower is provided with a head 113 which is adapted to engage the upper portion of the conveyor frame 81.

Figure 6:
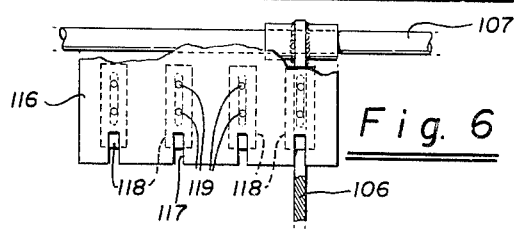
FIGURE 6 is a cross-sectional view taken along the line 6—6 of FIGURE 5.
Figure 10:
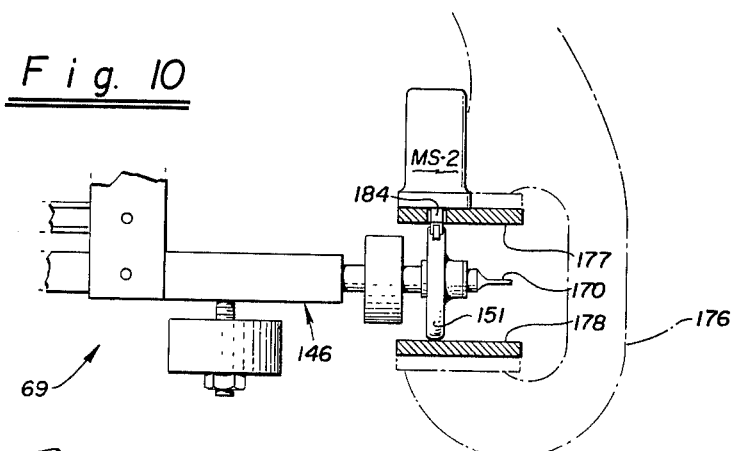
FIGURE 10 is an enlarged detail view taken along the line 10—10 of FIGURE 9.

Means is provided for retaining the arm 106 in a predetermined lateral position of the rod 107 so that the microswitch MS-1 will be maintained in engagement with one of the predetermined cam surfaces 103 provided on the hub 102. This means consists of a vertical plate 116 which depends from the conveyor frame 81 as shown particularly in FIGURE 5. The plate is provided with a plurality of spaced, open-ended, downwardly facing slots 117 which are adapted to receive the arm 106. Means is provided for adjusting the depth of the slots 117 and to thereby vary the vertical positioning of the microswitch MS-1 relative to the cam surfaces 103 and consists of small adjustment plates 118 which are secured to the plate 116 by pairs of cap screws 119. Each of the plates 118 is provided with an elongate slot 121 (see FIGURE 6) to permit vertical adjustment of the plate 118.

Means is provided on each of the stub conveyors for assuring that the cartons or trays, as they are delivered to the stub conveyor, are properly advanced by the continuously travelling belts 82 and 83. This means includes a pair of guide bars 126 which overlie the belts 82 and 83, as shown, and extend longitudinally of the stub conveyor. The spacing between the guide bars 126 is such that they receive a conventional egg carton which has two rows of six pockets each. The spacing between the pusher lugs on the index conveyor chain 91 is such that either cartons or trays can be positioned between the pusher bars 95 and advanced by the index conveyor chain 91. The guide bars 126 are such that they can receive the cartons between the same and still accommodate trays.

Means is provided for retaining the carton lids in an open position so that the carton can readily receive articles or eggs and consists of a hold-down device 127 (see FIGURES 7 and 32). The hold-down device is a single unitary structure and consists of a pair of vertical post-like members 128 and 129 which extend upwardly from one side of the conveyor frame 81. The hold-down device also includes a forwardly-extending curved member 131 that is an extension of the vertical post 129 and which is supported at its front end by a cross piece 132 secured to the post 128. The hold-down device also includes a downwardly curved forwardly-extending member 133 which has its front portion secured to the cross piece 132 by a support piece 134. The downwardly and forwardly-extending member 133 is utilized for retaining the carton in engagement with the conveyor, whereas the member 131 is utilized for bending the lid of the carton into an out-of-the-way position so that the carton can be filled with eggs as hereinafter described.

The transport or conveyor assembly 51, as described in our copending application Serial No. 89,275, filed February 14, 1961, consists of a pair of endless chains 141 and 142 which are mounted for travel in the framework 52 as shown particularly in FIGURE 16. The article carrying or transport devices 63 which are secured to the endless chains 141 and 142 are in the form of scale beam assemblies. Each of the scale beam assemblies consists of a block assembly 143 which is slidably mounted on rods 144 mounted in the endless chains 141 and 142. A balance beam 146 is pivotally secured to each of the block assemblies 143. A claw assembly 147 is mounted on one end of the scale beam 146 and is adapted to carry articles such as eggs. The claw assembly is movable between article retaining and article releasing positions. The claw assembly includes a latch arm 148 which, when triggered to an unlatching poistion, is adapted to permit the claw assembly to move to the article releasing position to release the article carried by the claw assembly. A roller 151 is mounted on the other end of the balance beam 146 and is adapted to travel in a cam track 152.

The cam track 152 in the weight stations is formed by a pair of spaced substantially parallel straps 153 and 154. These straps 153 and 154 are held in predetermined positions by arcuate brackets 156 which are secured to the main frame 52 as shown in FIGURE 16. Each of the arcuate brackets 156 is provided with an arcuate slot 157. A block 158 is provided for slidable movement relative to each of said arcuate brackets 156 and is secured in a predetermined position on the arcuate bracket by bolts 159 which extend through the block 158 and through the arcuate slot 157. A pair of blocks 161 are provided at each bracket 156 which have recesses which receive the straps 153 and 154 as shown particularly in FIGURE 12. The blocks 161 are secured to the block 158 and another similar block 162 by suitable means such as cap screws 163. The blocks 161 are spaced from the blocks 158 and 162 by spacers 164 and 166.

A slicer bar 168 is provided at each bracket 156 and is mounted on the blocks 158 and 162 by suitable means such as cap screws 169. The slicer bar is positioned in a predetermined location between the straps 153 and 154 forming the cam track 152. As will be noted particularly from FIGURE 11, each slicer bar is provided with tapered or pointed end portions 168a. As hereinafter explained, these slicer bars are used for dividing the scale beam assemblies according to weight. Each slicer bar moves the rear end balance beam of each scale beam assembly as it passes the slicer bar upwardly or downwardly depending upon whether the pointer or knife-like edge 170 of the scale beam assembly strikes the knife-like edge portion 168a of the slicer bar 168. Thus, if the article carried by the scale beam assembly is such that the knife edge is travelling in a position that it strikes the slicer bar 168 at a point which is below the pointed portion 168a, the rear end of the balance beam of the scale beam assembly will be urged downwardly by the slicer bar as it passes through the weight station. Conversely, if the weight of the article in the scale beam assembly is such that the pointer 170 is positioned above the tapered portion 168a, the rear end of the balance beam of the scale beam assembly will be tilted still further upwardly so that the roller 151 will be moved upwardly towards the upper strap 153.

The construction hereinbefore described for supporting the straps 153 and 154 is provided in each of the weight stations with the exception of the peewee station. Means is provided at each of the weight stations, with the exception of the peewee station, for sensing when the knife edge 170 carried by the scale beam assembly travels above the slicer bar 168 in a particular weight station. Such means is of the photoelectric type and consists of a lamp 171 which is mounted in a block 172 secured to the upper block 161. A photosensitive device 173 is mounted in the spacer bar 174 and is adapted to receive light through a relatively small opening 174 provided in the block 174. It can be seen from FIGURE 12 that when the knife edge 170 travels above the slicer bar, the wheel 151 will cut off the light from the lamp 171 to the photocell 173. This photoelectric sensing means in each weight station is utilized for counting the eggs or articles discharged in each of the weight stations as hereinafter described.

In the commercial station, a relatively simple bracket 176 is provided for supporting cam track members 177 and 178 which form a part of the the cam track 152 as shown in FIGURE 11. The straps 153 and 154 which form the portion of the cam track 152 passing through the weight stations are tensioned in a suitable manner such as by means of springs 181 secured to posts 182 provided on the cam track members 177 and 178.

Means is also provided on each of the commercial stations for counting the articles or eggs which are discharged in a particular commercial station and consists of a microswitch MS–2 which has its operating arm 184 extending downwardly through a slot provided in the upper cam track member 177. The microswitch MS–2 for each commercial station is positioned laterally of the cam track member 177 so that it is engaged by the wheel or roller 151 of certain scale beam assemblies. These are the scale beam assemblies which have been positioned laterally with respect to the endless chains 141 and 142 in the candling stations as described in our copending application Serial No. 89,275, filed February 14, 1961, so that the eggs carried by these scale beam assemblies are discharged in the commercial stations. Thus, the Microswitch MS–2 is positioned in each commercial station so that its operating arm 184 will be engaged by the rollers 151 of the scale beam or article carrying assemblies which discharge their articles or eggs in that commercial station. The microswitch in each of the commercial stations is utilized for counting purposes as hereinafter described.

Figure 2:
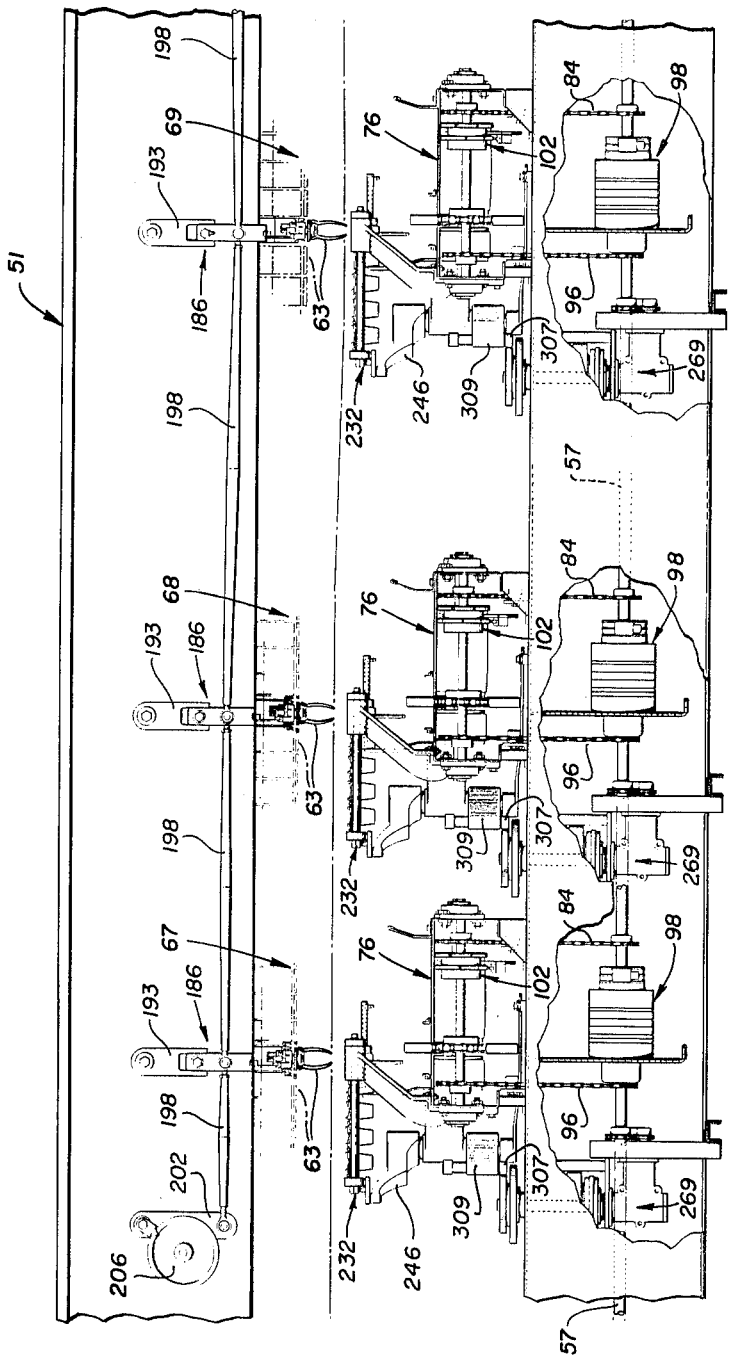
FIGURE 2 is an enlarged view of the portion of the apparatus enclosed within the line 2—2 in FIGURE 1.
Figure 3:
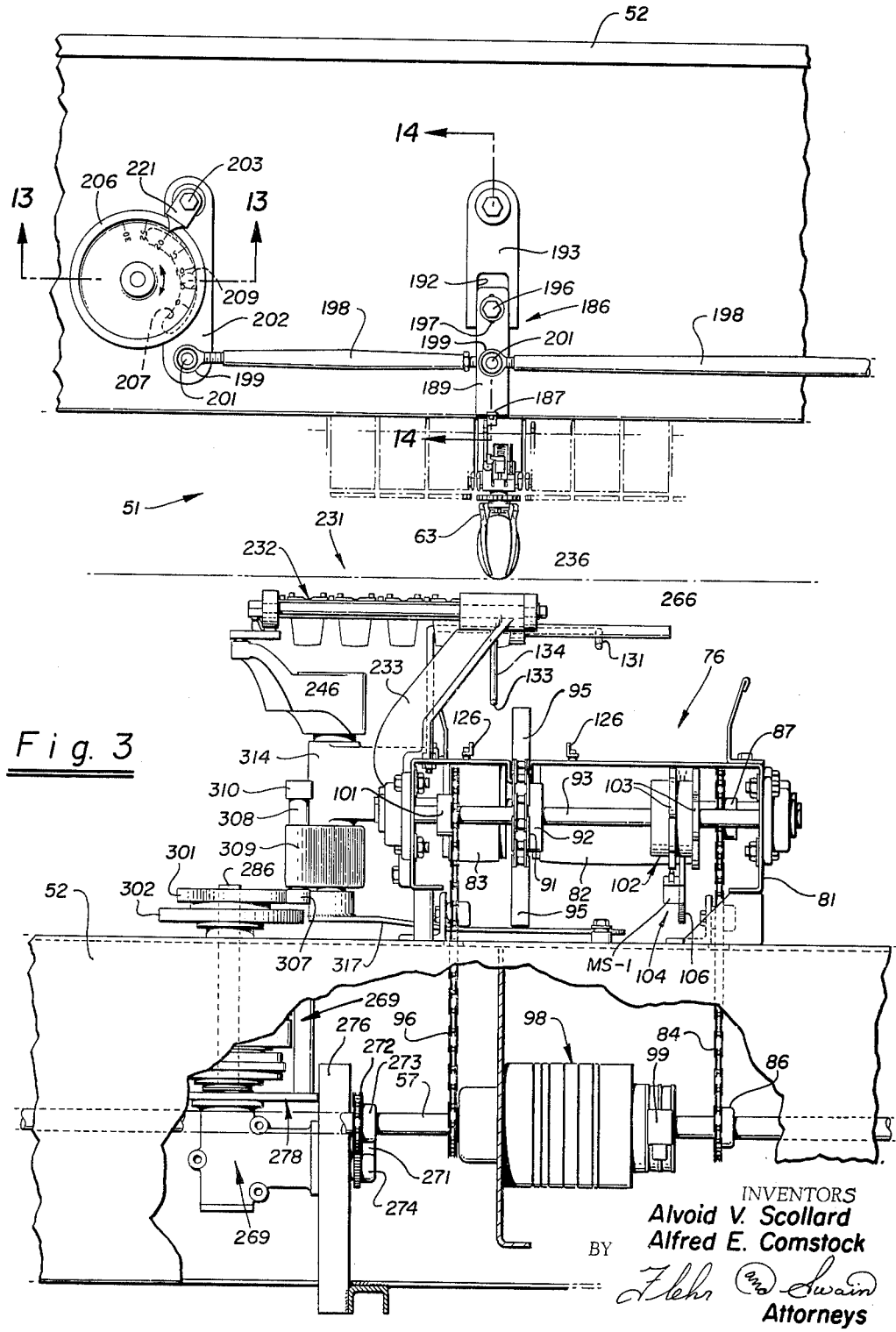
FIGURE 3 is an enlarged front elevational view with certain portions of the framework broken away of the first commercial station shown in FIGURE 1.
Figure 4:
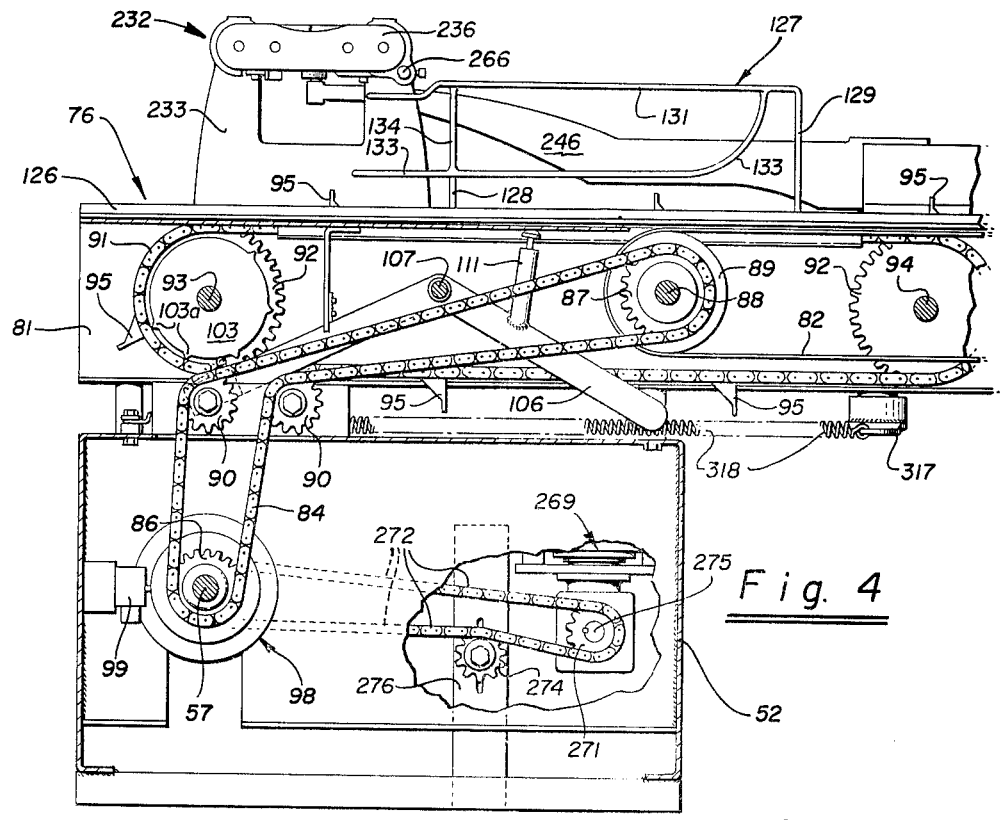
FIGURE 4 is a cross-sectional view taken along the line 4—4 of FIGURE 3.

Mechanically positioned means is provided for causing the article carrying devices or scale beam assemblies 63 to discharge the articles carried thereby in the commercial or weight stations in accordance with their weight. For example, in each of the commercial stations, an unlatching member 186 is provided which is movable laterally of the framework 52 as shown in FIGURES 3 and 14. In each of the weight stations, an L-shaped unlatching member 187 is provided which can be moved laterally and vertically with respect to the framework 52 as shown in FIGURES 2 and 16.

The unlatching members 186 and 187 are secured to depending arms 189 by suitable means such as cap screws 191. The arms 189 are slidably received for substantially vertical downwardly facing movement in open-ended recesses 192 formed in members 193 which are pivotally connected to the main frame 52 by suitable means such as cap screw assemblies 194 as shown in FIGURE 14. The arms 189 are retained in a desired position in the recesses 192 by cap screws 196 threaded into the member 193 and extending through elongate slots 197 provided in the arms 189. The arms 189 are connected by horizontally extending links. Eyes 199 are threaded into the ends of the connecting links 198 and are pivotally connected to intermediate portions of the arms 189 by cap screw assemblies 201 which permit pivotal movement of the screw eyes 199 relative to the arms 189 (see FIGURES 3 and 14). An additional arm 202 is provided (see FIGURE 3) which has the connecting link 198 pivotally connected to the lower extremity thereof. The upper extremity of the arm 202 is pivotally connected to the frame 52 by a cap screw assembly 203.

Means is provided for pivoting the arm 202 about the cap screw assembly 203, and at the same time shifting all of the arms 189 in unison therewith and consists of a hand wheel 206 which is provided with an arcuate recess 207 on its rear side (see FIGURES 3 and 13). The arm 202 is provided with a pin 208 which carries a roller 209 which travels in the recess 207. The wheel 206 is rotatably mounted on a flanged hollow cylindrical member 211 which is affixed to the frame 52 by suitable means such as bolts 212. A potentiometer 213 is mounted on the other side of the frame 52 immediately opposite the flanged member 211 and is utilized for controlling the speed of the variable speed drive motor 54 for a purpose hereinafter described. The potentiometer 213 is provided with an adjusting shaft 214 which extends through the framework 52 and which is connected to a cylindrical connecting member 216 by a set screw 218. The wheel 206 is secured to an extension 216a of the cylindrical member 216 by a set screw 219.

From the foregoing construction, it can be seen that as the wheel 206 is rotated, the shaft 214 of the potentiometer 213 will be rotated therewith to control the speed of the variable speed drive motor 54. Rotation of the hand wheel 206 in a clockwise direction from the center position shown in FIGURE 3 will cause the links 198 with the arms 189 to be moved to the left as viewed in FIGURE 3 to cause the unlatching members 186 and 187 also to be moved to the left to thereby in effect move or shift the tripping points for the scale beam assemblies so that they will discharge the articles carried thereby in the stations at points which are ahead of the points at which the articles would have been discharged previously. Conversely, when the hand wheel 206 is rotated in a counterclockwise direction, the links 198 and the arms 189 connected thereto are shifted to the right to move the unlatching members 186 and 187 to positions which are to the right of the positions shown in FIGURE 3 so that the articles are discharged from the scale beam assemblies at points which are behind the previous discharge points or positions.

As hereinafter explained, this means for adjusting the position of the unlatching members 186 and 187 is provided to compensate for the difference in trajectories of the articles as they are discharged from the scale beam assemblies which is caused by the difference in speed of travel of the scale beam assemblies. It is readily apparent that as the speed of travel of the scale beam assemblies is increased, the trajectories of the eggs or articles as they drop will increase in arcuateness, whereas when the speed of travel of the scale beam assemblies is decreased, the trajectories of the eggs will decrease in arcuateness. It is for this reason when the articles or eggs are to be received in predetermined positions, the points at which the articles or eggs are discharged from the scale beam assemblies are shifted to the left or right as viewed in FIGURE 3 to compensate for the change in trajectories of the eggs. As shown in FIGURE 3 of the drawings, the wheel 206 can be calibrated in accordance with the speed of travel of the scale beam assemblies. Thus, for example, as shown in FIGURE 3, the wheel 206 can be calibrated in the number of cases of eggs per hour which can be handled by the machine. A pointer 221 is provided as a part of the cap screw assembly 203 and is utilized in conjunction with the scale provided on the wheel 206. In the position of the wheel 206 shown, the drive motor 54 is adjusted to a speed so that our apparatus will handle twenty cases of eggs per hour or, in other words, six hundred dozen eggs per hour.

Means is provided for receiving and accumulating the articles or eggs discharged by the article carrying devices or scale beam assemblies 63 and consists of an accumlator assembly 231. The accumulator assembly is comprised of an accumulator 232 which is mounted upon a casting 233 that is affixed to one side of the conveyor frame 81. The accumulator 232 consists of a pair of spaced parallel horizontal rods 234 which are slidably mounted in cylindrical portions 223a and 233b of the casting 233 for reciprocatory movement in a horizontal plane. A pair of spaced horizontal cross pieces 236 and 237 are secured to the ends of the rods 234 by suitable means such as set screws 238. The rods 234 and the cross pieces 236 and 237 form a rectangular framework for egg receiving means which consists of a pair of spaced parallel bars 241 having a rectangular cross-section. The bars 241 are provided with cylindrical extensions 241a which are rotatably mounted in the cross pieces 236 and 237.

Figure 19:
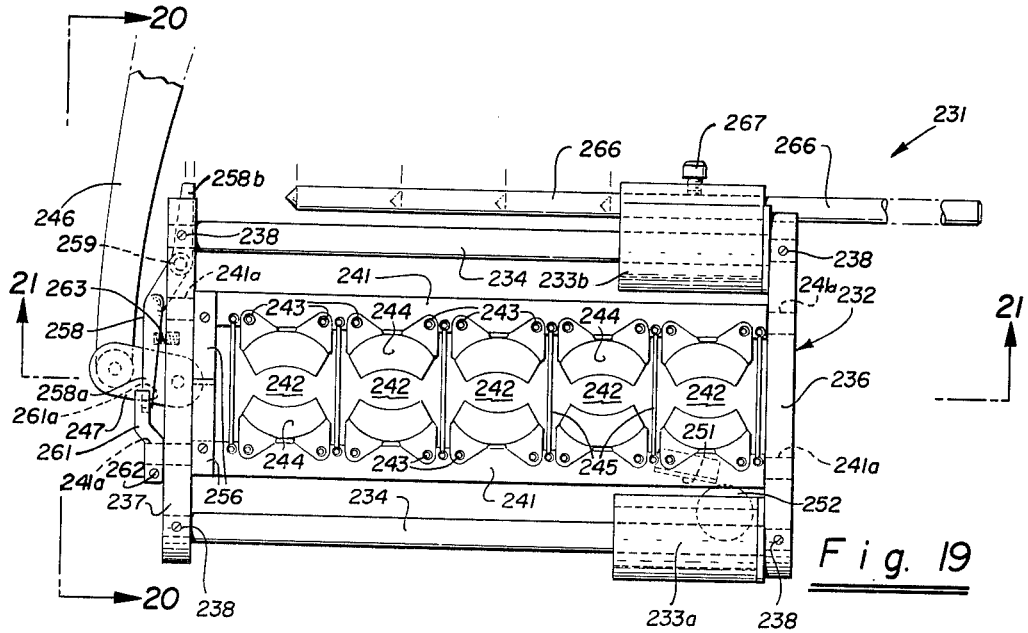
FIGURE 19 is an enlarged detail view in plan of the accumulator in a position to receive articles or eggs.
Figure 21:
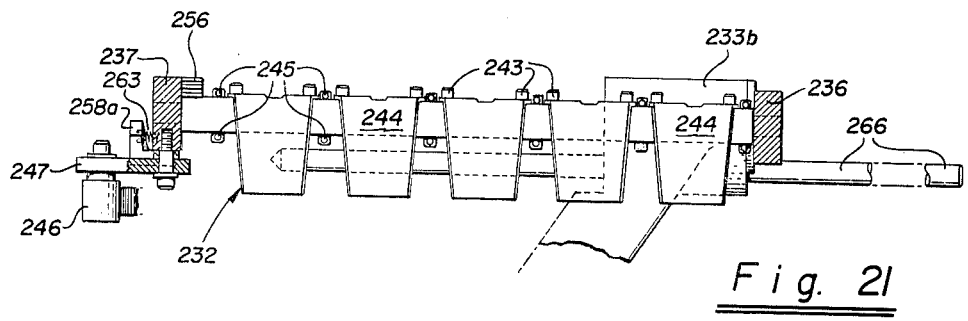
FIGURE 21 is a cross-sectional view taken along the line 21—21 of FIGURE 19.

Means forming a plurality of egg receiving pockets are mounted on the bars 241 and extend longitudinally of the bars. As shown particularly in FIGURES 19 and 21 of the drawings, the means forming the egg receiving pockets 242 consists of pairs of spaced cooperating pocket-forming members 244 facing each other which are affixed to the top surfaces of the bars 241 by suitable means such as "Allen head" screws 243. As can be seen from the drawing, the pocket-forming members 244 are arcuate in cross-section and are tapered inwardly in a downward direction. In addition, the pocket-forming members are inclined in a direction away from the associated bars 241 and towards each other as shown particularly in FIGURE 19. The pocket forming means also includes yieldable members in the form of pairs of spaced parallel springs 245 which are affixed to the top and bottom surfaces of the bars 241 as shown in FIGURES 19 and 21 of the drawings. As can be seen particularly from FIGURES 19 and 21, the springs are mounted between each cooperating pair of pocket-forming members 244 and on the ends of the entire group of pocket-forming members so that two pairs of springs in cooperation with a pair of the pocket-forming members 244 form sides of pockets for receiving the articles or eggs discharged from the commercial and weight stations as hereinafter described.

Figure 23:
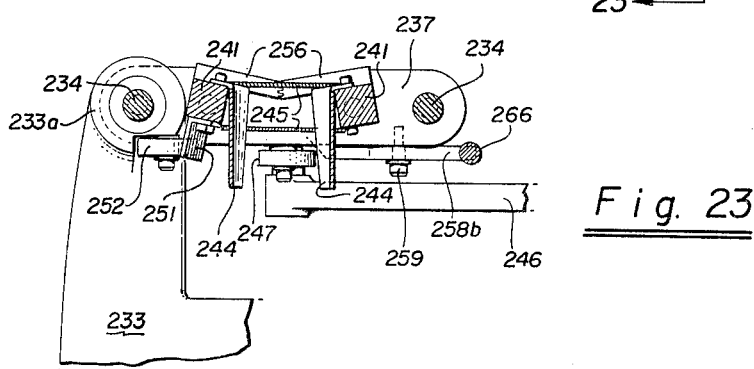
FIGURE 23 is a cross-sectional view taken along the line 23—23 of FIGURE 22.

The bars 241, as hereinbefore explained, are rotatable in the cross pieces 236 and 237 so that the pocket-forming members 244 can be shifted from an egg or article-retaining position to an egg or article-discharging or releasing position. Means is provided for yieldably urging the pocket-forming members 244 into egg releasing positions and consists of the springs 245. To accomplish this function, the upper springs 245 are tensioned to a greater extent than the lower springs 245 so that the top or upper springs 245 tend to yieldably pull the upper extremities of the bars 241 towards each other to pivot the same about their cylindrical portions 241a and to thereby tilt the lower extremities of the pocket-forming members 244 away from each other to positions shown in FIGURE 23.

Means is also provided for returning the pocket-forming members 244 to egg-retaining positions and latching them in this position, and thereafter unlatching the latching means so that the pocket-forming members can release the articles carried therein. Means is also provided for shifing the accumulator 232 parallel to the path of travel of the transport assembly 51 which includes an accumulator arm 246 which is operated as hereinafter described. The accumulator arm 246 is connected to the cross piece 237 by a link 247 as shown particularly in FIGURE 19.

Figure 20:
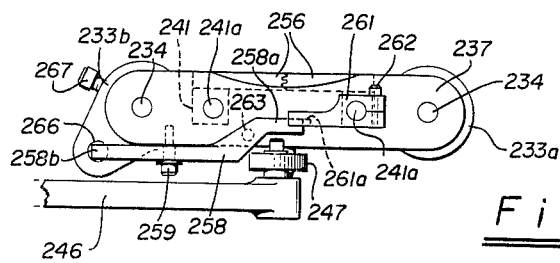
FIGURE 20 is a side elevational view of the accumulator as shown in FIGURE 19 looking along the line 20—20.
Figure 24:
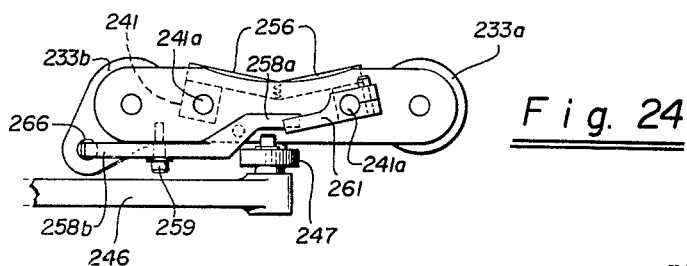
FIGURE 24 is a side elevational view looking along the line 24—24 of FIGURE 22.

The means for returning the pocket-forming members 244 to their article-retaining positions consists of a curved plate-like cam member 251 which is affixed to one of the bar 241 as shown in FIGURES 19 and 21 and which is adapted to engage a roller 252 rotatably mounted upon a pin 253 carried by the cylindrical portion 233a of the casting 233. When the accumulator is returned to its home position as hereinafter described, the cam 251 engages the roller 252 to cause the bars 241 to be rotated to move the pocket-forming members to article-retaining positons. Both of the pocket-forming members are rotated at the same time because of gear-like members 256 which are mounted on the ends of the bars 241. These gear-like members 256 are provided with teeth 256a (see FIGURES 20 and 24) so that the bars 241 will move in unison. Only a few teeth are required on the gear-like members 256 because the bars 241 travel through a relatively small angle as the pocket forming members 243 are moved between article-retaining and article-releasing position.

The means provided for latching the pocket-forming members into article-retaining positions consists of an unlatching lever 258 which is pivotally mounted on the lower surface of the cross piece 237 by a cap screw 259. The lever 258 is provided with a portion 258a movable toward and away from the cross piece 237 which is adapted to engage a pawl 261 mounted on a cylindrical extension 241a of one of the bars 241. As will be noted from FIGURE 24 of the drawing, the pawl is split and is provided with a cap screw 262 so that the angular position of the pawl 261 relative to the bar 241 can be adjusted. Means is provided for yieldably urging the lever 258 into a position in which it engages the pawl 261 and consists of a spring 263 disposed in wells provided in the lever arm 258 and in the cross piece 237. It can be seen that when the pawl 261 is raised to the position shown in FIGURE 20, the portion 258a of the lever 258 will be moved outwardly by the spring 263 (FIGURE 19) so that it underlies the pawl 261 to thereby retain the pocket-forming members 243 in article-receiving positions. The pawl 261 is provided with a recess 261a which is adapted to receive the portion 258a of the lever 258 as shown particularly in FIGURE 20. Thus, it can be seen that the lever 258 with the pawl 261 provides latching means for retaining the pocket-forming members 244 in article-retaining positions.

Means for unlatching the latching means consists of a rod 266 which is slidably mounted in the portion 233b of the casting 233 and which is held in a predetermined position by a set screw 267. As can be seen from FIGURES 19 and 22, the rod 266 extends in a direction which is parallel to the rods 234 and is positioned in such a manner that an extension 258b of the lever 258 is adapted to engage the rod as the accumulator is shifted to the right as viewed in FIGURES 19 and 22 by the accumulator arm 246. As hereinafter explained, the rod 266 is adapted to be adjusted in various positions to thereby adjust the point at which the latching means for the accumulator will be unlatched and to thereby determine the number of articles which will be accumulated in the accumulator 232 before they are discharged or released from the accumulator.

Figure 17:
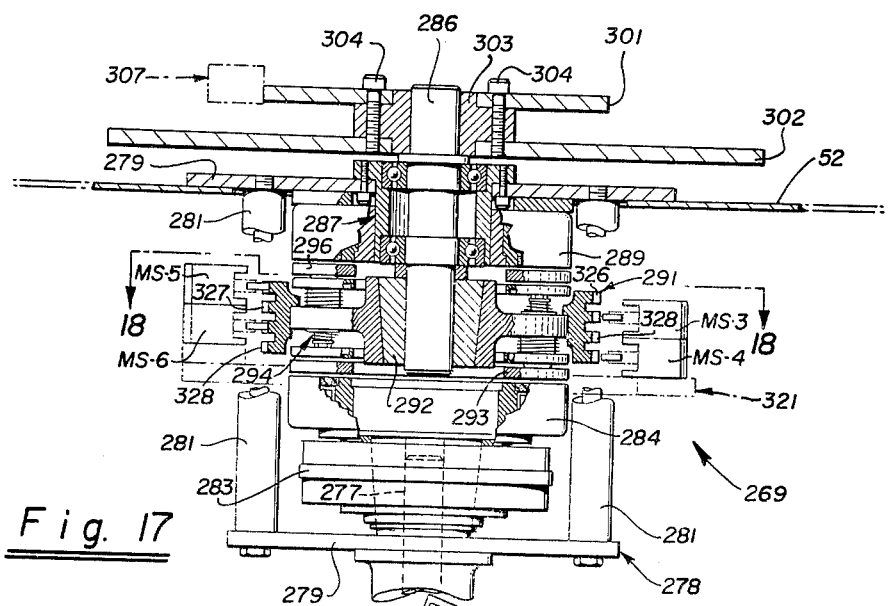
FIGURE 17 is an enlarged cross-sectional view taken along the line 17—17 of FIGURE 7 and also along line 17—17 of FIGURE 18, and particularly shows the clutch and brake mechanism for the accumulator cams.

The means for moving the accumulator arm 246 to cause rectilinear movement of the accumulator 232 consists of an electric clutch and brake assembly 269 as shown particularly in FIGURES 7 and 17. The clutch and brake assembly is provided with a drive sprocket 271 which is driven by a chain 272. The chain 272 is driven by a sprocket 273 affixed to the shaft 57. Since the shaft 57 is driven continuously, the chain 272 is driven continuously. A chain tightener in the form of a sprocket 274 is mounted for vertical movement on a member 276 affixed to the frame 52.

The sprocket 271 drives a shaft 275 which, through worm gearing (not shown), drives a shaft 277. The shaft 277 extends through a frame 278 consisting of end plates 279 mounted upon supporting rods 281. A slip ring assembly 283 and a clutch magnet 284 fastened together as a single unit are secured to the shaft 277 and rotate therewith. The clutch and brake assembly 269 also includes another shaft 286 which is rotatably journalled in the top plate 279 by a bearing assembly 287. A brake magnet 289 is secured to the bearing assembly 287 and is held in a stationary position. An armature hub 291 is secured to the lower end of the shaft 286 by suitable means such as a "Taperlock" bushing 292. A clutch armature 293 is secured to the armature hub 291 in a suitable manner such as by means of spring and bolt assemblies 294 so that when the clutch magnet 284 is energized, the shaft 286 will be caused to rotate with the shaft 277. A brake armature 296 is secured to the armature hub 291 by the same nut and bolt assemblies 294. When the brake magnet 289 is energized, the brake armature prevents further rotation of the shaft 286. The portions of the clutch and brake assembly 269 hereinbefore described are substantially conventional. For example, they can be a unit of the "Autogap" type manufactured by Warner Electric Brake & Clutch Co. of Beloit, Wisconsin.

As hereinafter described, the clutch and brake assembly 269 is utilized for operating the accumulator arm 246 and also for operating the accumulator switch means. A pair of cams 301 and 302 are mounted upon a hub 303 in a suitable manner such as by the use of cap screws 304. The hub 303 is secured to the shaft 286 so that it rotates with the shaft. The two cams 301 and 302 have different configurations as shown particularly in FIGURES 29 and 30B and can be called the two-drop and five-drop cams, respectively. An additional cam 306 is provided which may be substituted for cam 302 and may be called the jumbo or four-drop cam. The purpose of these cams will be described in detail hereinafter.

A roller-type cam follower 307 is adapted to engage either the cams 301 or 302 and is carried by a shaft 308 which is slidably mounted in an arm 309. The upper end of the shaft 308 is provided with an enlarged knurled portion which serves as a knob 310 to permit the shaft and the cam follower 307 carried thereby to be raised and lowered so that the cam follower can be moved into engagement with either the cam 301 or the cam 302. Detent means is provided within the arm 309 and engages the shaft 308. The detent means is provided to retain the follower 307 in engagement with either of the two cams 301 and 302. This detent means, as shown in FIGURE 7, consists of a spring 300 which is mounted in a well in the arm 309 and yieldably urges a ball 311 towards the shaft 308 to engage selected recesses 312 provided in the shaft 308 to retain the shaft in the desired position.

The arm 309 is secured to a shaft 313 which is rotatably mounted in a pillow block 314 secured to one side of the frame 81 of the stub conveyor. As can be seen from FIGURE 7, the end of the arm 309 secured to the shaft 311 is split and is provided with cap screws 315 so that the angular position of the arm 309 relative to the shaft 313 can be adjusted. The accumulator arm 246, as hereinbefore described, is secured to the upper end of the shaft 313 and is also split and provided with cap screws 316 so that the angular position of the arm relative to the shaft 313 can be adjusted.

Means is provided for yieldably urging the cam follower 307 into engagement with the cams 301 and 302 and consists of another arm 317 (see FIGURE 3) which is affixed to the lower end of the shaft 313 and has its other end connected to one end of a spring 318. The spring extends substantially longitudinally of the stub conveyor 76 and has its other end connected to a post 319 secured to the main frame 52. From the drawings, it can be seen that the direction of the pull of the spring 318 is such that it yieldably urges the cam follower 307 into engagement with the cams 301 and 302 so that the cam follower will always follows the cam surfaces on the cams. It is also apparent that as the cam follower 307 follows the cam surfaces, the arm 309 and the accumulator arm 246 will follow the movement of the cam follower which, in turn, controls the rectilinear movement of the accumulator 232.

Figure 9:
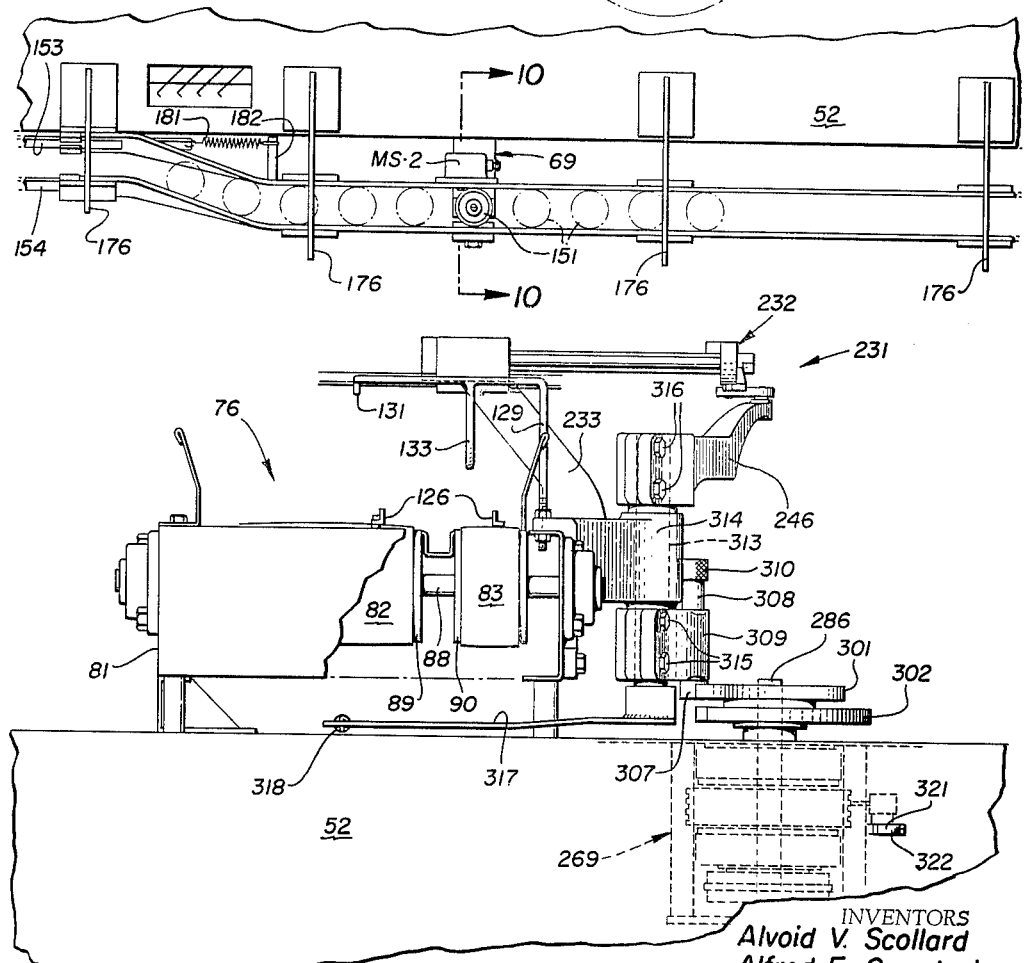
FIGURE 9 is a rear elevational view looking along the line 9—9 of FIGURE 7.
Figure 18:
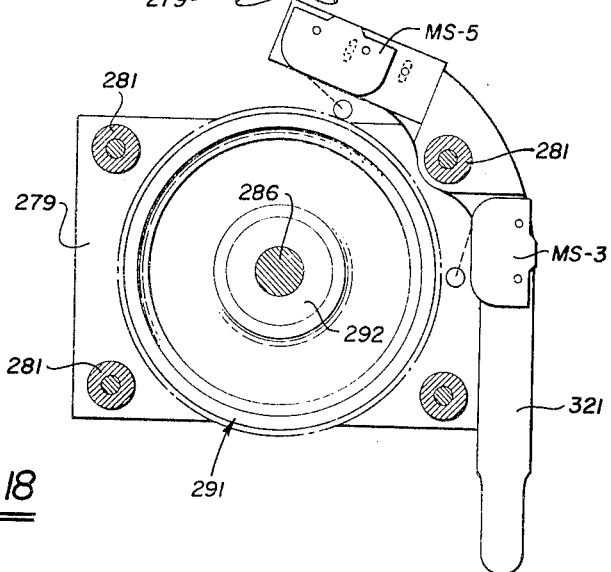
FIGURE 18 is a cross-sectional view taken along the line 18—18 of FIGURE 17.

As hereinbefore explained, accumulator switch means is provided which is operated by the clutch and brake assembly 269. The accumulator switch means includes four switches of a suitable type such as microswitches which are identified as MS-3, MS-4, MS-5 and MS-6. These microswitches, as can be seen from FIGURES 17 and 18, are mounted in pairs in a vertically spaced relationship on an accumulator switch arm 321 which extends outwardly through the rear of the frame through an opening 322 as shown in FIGURE 9 so that its position can be controlled manually from the rear of our apparatus as hereinafter described. The accumulator switch arm 321 is pivotally mounted upon one of the posts 281 and is movable between two positions. In one position, the microswitches MS-3 and MS-4 are in engagement with cam means carried by the armature 291 and in the other position of the accumulator switch arm, the microswitches MS-5 and MS-6 are in engagement with the cam means. The cam means consists of four different cam surfaces or cams 326, 327, 328 and 329 as shown in FIGURES 31A–31D, and which have raised portions 326a 327a, 328a and 329a, respectively. The raised portions are utilized for moving the operating arms of the microswitches MS-3–MS-6 as hereinafter described. As also hereinafter explained, the microswitches MS-3 and MS-4 are associated with the two-drop cam 301 and the microswitches MS-5 and MS-6 are associated with the five-drop or four-drop cams 302 and 306. It can be seen that the cams 326–329 travel with the armature hub 291 and are only driven at the time the shaft 286 is driven. In other words, they are only driven at the time that the clutch magnet 284 is energized.

Figure 33:
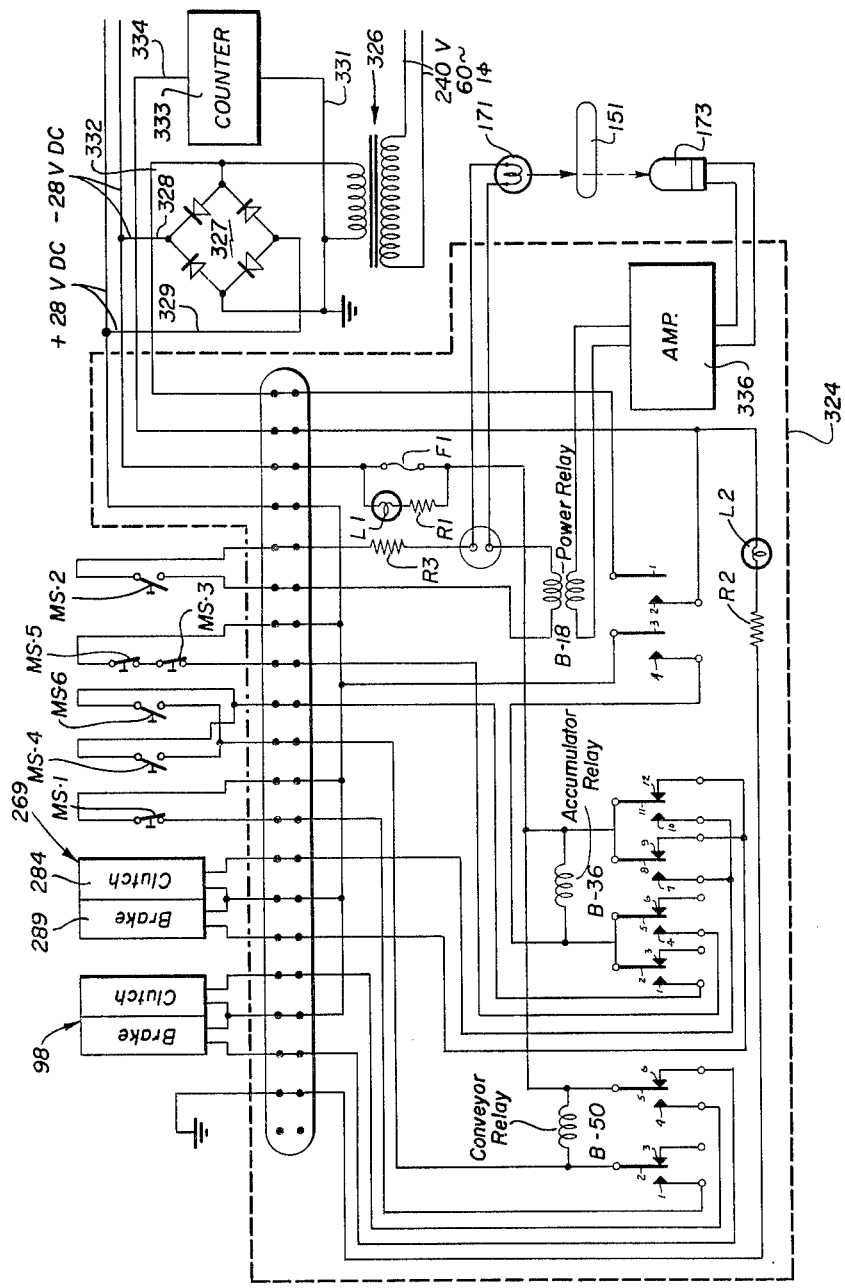
FIGURE 33 is a circuit diagram with certain of the parts shematically illustrated utilized in our apparatus.

Operation and use of our egg handling, sorting and packing apparatus can now be briefly described in conjunction with the circuit diagram which is shown in FIGURE 33. Each of the weight and commercial stations includes a control box 324 which is mounted on the rear of the main framework 52 which includes the circuitry which is shown within the dotted line in FIGURE 33. A power supply is provided for all of the control boxes and, as shown schematically in FIGURE 33, consists of a transformer 326, the primary of which is connected to a conventional power supply such as 240 volts 60 cycle single phase A.-C. The secondary of the transformer provides a suitable output such as approximately 30 volts A.-C. which is supplied to a full wave rectifier 327. The positive D.-C. output from the full wave rectifier is supplied to a line 328, whereas the negative side is supplied to a line 329. The A.-C. output of the secondary of the transformer 326 is also supplied to the conductors 331 and 332 in which conductor 331 is connected to a counter 333. Another conductor 334 is connected between the counter 333 and the control box 324 provided for each of the weight and commercial stations.

Each of the control boxes 324 includes a power relay B-18, an accumulator relay B-36 and a conveyor relay B-50, with their associated contacts as indicated in the circuit diagram. The circuitry within each control box 324 also includes an amplifier 336 for amplifying the output from the associated photocell 173. The amplifier is connected to one of the windings of the power relay B-18 as shown in the drawings for the control boxes provided for the weight stations. The lamp 171 for the associated weight station is connected into the circuitry as shown. The other winding of the relay B-18 is connected to the associated microswitch MS-2 for the control boxes for the commercial stations. Additional lamps L-1 and L-2 have been provided for purposes hereinafter described. Voltage dropping resistors R-1, R-2 and R-3 have been provided in series with the lamps.

Now let it be assumed that articles such as eggs are being delivered by the feed-in conveyor to the article pick-up station 62. The articles are then delivered into the article carrying devices or scale beam assemblies 63 which form a part of the transport or conveyor assembly 51 and are retained thereby for travel along the path taken by the conveyor. Also let it be assumed, as described in our copending application Serial No. 89,275, filed February 14, 1961, that control knobs (not shown) provided on each of the scale beam assemblies 63 are operated by the operator in the candling station 64 to cause lateral positioning of the scale beam assemblies in accordance with the grade of eggs carried by each of the scale beam assemblies. After the article carrying devices or scale beam assemblies 63 have passed through the candling station, they pass through a blood drop station 66 and all of the scale beam assemblies carrying eggs of this classification are tripped by means (not shown) at this station to release the blood eggs at this station.

The scale beam assemblies 63 continue their travel along the conveyor path and next pass through the two commercial stations 67 and 68. During the travel of the scale beam assemblies in this fashion, the wheels 151 of the scale beam assemblies are travelling in the cam track 152 provided on the rear of the main frame 52. As also explained previously, each of the commercial stations is provided with a microswitch MS–2 which is positioned laterally of the cam track 152 so that it will be engaged by the wheels 151 of the scale beam assemblies which have been positioned laterally in accordance with the commercial grades of eggs carried by the scale beam assemblies. Thus, all of the scale beam assemblies carrying the eggs of the particular commercial grade to be dropped in the first commercial station 67 are positioned laterally so their wheels 151 engage the microswitch MS–2 provided in that station as they travel through the station.

Figure 25:
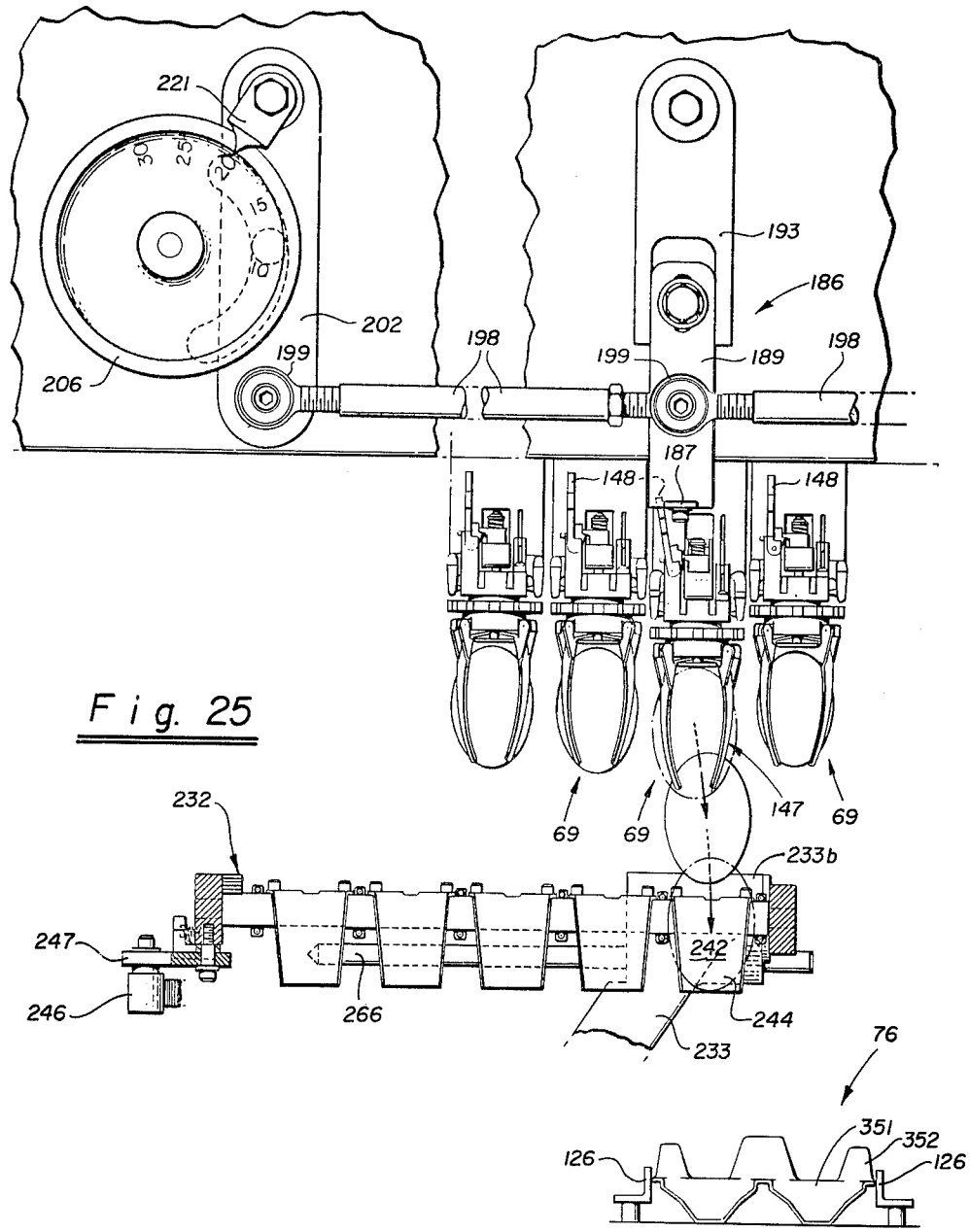
FIGURE 25 is an enlarged detail view of one of the weighing stations showing the first egg being dropped into the accumulator.

However, prior to the operation of the microswitch MS–2 by the wheel 151 of a scale beam assembly 63, the egg carried by the scale beam assembly will be discharged into the accumulator 232 as shown in FIGURE 25 when the latch arm 148 of the scale beam assembly strikes the unlatching member 186 positioned in the station. Movement of the latch arm 148 permits the claw assembly 147 to move to the article release position to release the egg and to permit it to drop by force of gravity into the accumulator 232.

In this discussion of the mode of operation for our apparatus, let it be assumed that the accumulator 232 is positioned so that the egg is dropped into the first article receiving pocket of the accumulator as shown in FIGURE 25. From this description, it can be seen that the egg is caused to be discharged or released by mechanical trip means and that no electrical signal is required for this portion of the operation. Also, it should be noted that the egg, as it drops into the accumulator 232, has a curved or arcuate trajectory as shown by the arrows in FIGURE 25. The curving or arcuateness of the trajectory is caused by the continuous forward motion of the conveyor or transport assembly 51 and its multiplicity of scale beam assemblies 63. It will be noted that the unlatching member 186 is positioned in such a manner that it causes the egg to be released at a point which is slightly ahead of a point directly above the pocket in which the egg is to be deposited in the accumulator 232. This is to compensate for the forward motion of the transport assembly 51 carrying the eggs when the eggs are dropped. As will hereinafter be explained, the positioning of this unlatching member 186 is adjusted in accordance with the speed of the conveyor so as to compensate for the changes in the trajectory of the eggs or articles as they are dropped.

A short time after the egg has been released or discharged by the scale beam assembly, the wheel 151 of the scale beam assembly operates the microswitch MS–2. As shown in FIGURE 33, microswitch MS–2 is normally open so that upon operation, it is closed to energize one of the windings of the relay B–18 by connecting it to the positive and negative D.-C. lines 328 and 329. Operation of relay B–18 closes its contacts 1 and 2 which causes a pulse to be supplied to the counter 333 to register a count in the counter. At the same time, power is supplied to the lamp L–2 to visually indicate that a count has been made. It will be noted that a fuse F–1 is provided in the line 328. When this fuse is burned out, a lamp L–1 is lit.

Operation of relay B–18 also closes its contacts 3 and 4 to connect the winding of the accumulator relay B–36 across the D.-C. lines 328 and 329. Upon examining the contacts of relay B–36, it will be noted that contacts 7 and 10 are in parallel; that contacts 9 and 12 are in parallel; and that contacts 8 and 11 are in parallel. These contacts are paralleled to provide additional reliability. When the relay B–36 is energized, the movable contacts 8 and 11 are moved into engagement with stationary contacts 7 and 10 to cause the application of D.-C. voltage to the clutch magnet 284 of the clutch and brake assembly 269. Prior to energization of the clutch magnet 284, the brake magnet 289 is deenergized because the movable contacts 8 and 11 have moved out of engagement with the stationary contacts 9 and 12.

Energization of the accumulator relay B–36 also causes closing of its contacts 4 and 5 which establish a holding circuit for the relay B–36 through the serially connected, normally closed microswitches MS–3 and MS–5.

Energization of the clutch magnet 284 and deenergization of the brake magnet 289 causes shaft 286 to be rotated in unison with the shaft 277. As explained previously, the shaft 277 is continuously rotated by the variable speed drive motor 54. Cams 301 and 302 rotate with the shaft 286.

Now let it be assumed that it is desired to accumulate only two articles or eggs in the accumulator 232 before the articles or eggs are released from the accumulator. When this is the case, the cam follower 307 is shifted upwardly by use of the knob 308a so that it engages the cam 301. Rotation of the cam 301 from the position shown in FIGURE 8 will cause the arm 309 to be moved outwardly away from the shaft 286 to cause counter-clockwise rotation of the shaft 313 as viewed in FIGURE 8. This, in turn, will cause counter-clockwise movement of the accumulator arm 246 which will cause the accumulator to be shifted to the left as viewed in FIGURE 8. Movement of the accumulator 232 is continued until the microswitch MS–5 is operated by a raised portion 327a of the cam 327 provided on the armature hub 291. Operation of the microswitch MS–5 opens the holding circuit for the accumulator relay B–36 to thereby deenergize the clutch magnet 284 and to again energize the brake magnet 289 to stop the rotation of the shaft 286 and the cam 301 carried thereby. The cam 301 is shaped so that the accumulator 232 is shifted to a position in which the second article receiving pocket from the left as viewed in FIGURE 8 is in a position to receive the next article which could possibly be discharged from the transport or conveyor assembly 51. Since it is possible that eggs of the same grade could be carried by adjacent article carrying devices which from a part of the transport or conveyor assembly 51, the movement of the accumulator 232 must be sufficiently rapid so that it is in position to receive the next article or egg which could be discharged in the commercial station in the event the next scale beam assembly is also carrying an egg of the same grade.

Figure 26:
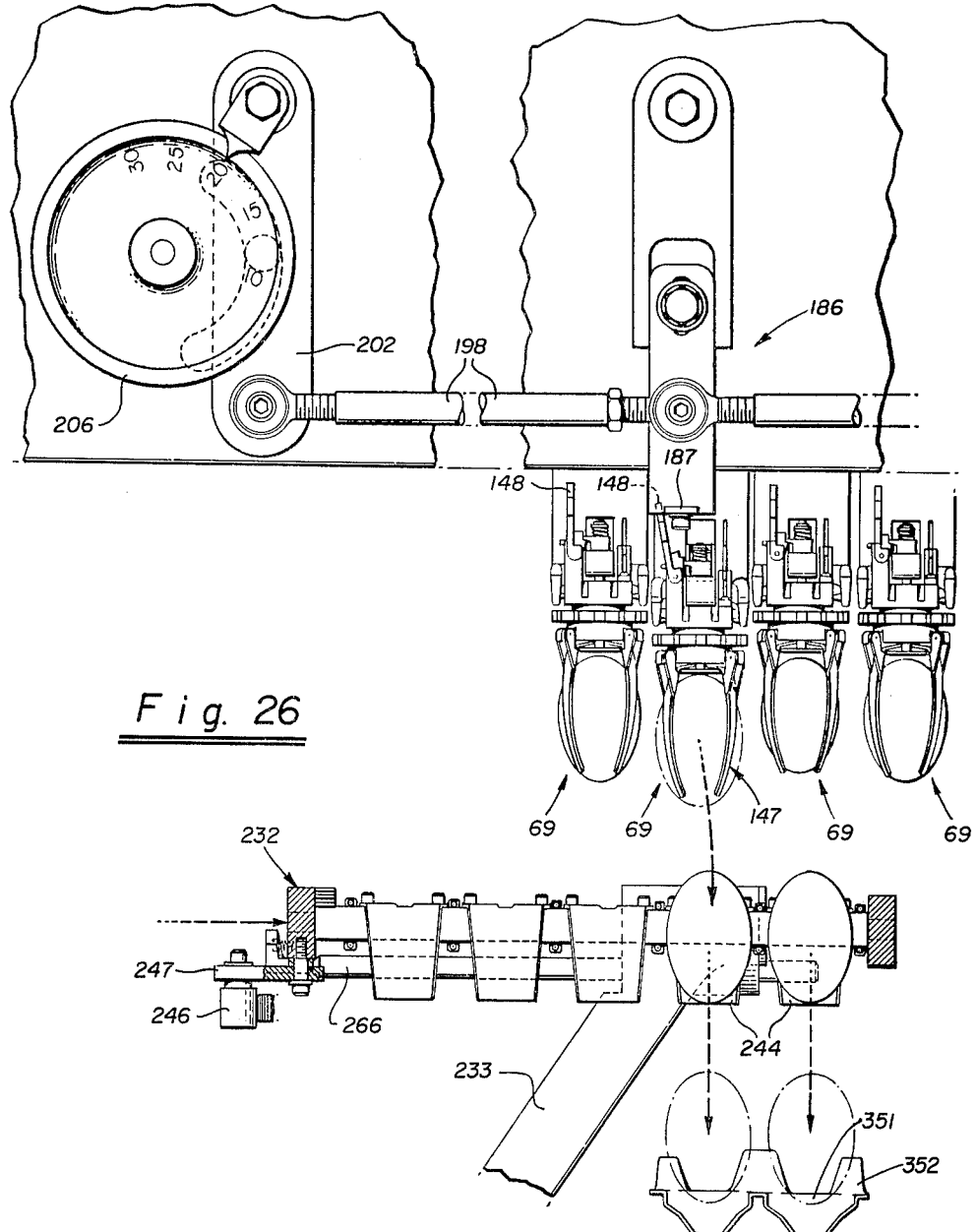
FIGURE 26 is a view similar to FIGURE 25 showing the second egg being dropped into the accumulator and with the accumulator depositing eggs in the carton or tray after two eggs have been received or collected by the accumulator.

Now let it be assumed that a scale beam assembly carrying an egg of the same grade passes into the first commercial station 67 after the first egg of that grade has already been dropped as hereinbefore described. This second egg of the same grade will be released when the latch arm 148 strikes the unlatching member 186 so that it will be discharged into the second pocket of the accumulator 232 counting from the right as viewed in FIGURE 26. It will again be noted that the accumulator 232 and the unlatching member 186 are positioned in such a manner that the egg will fall directly into the center of the pocket even though the trajectory of the egg is slightly curved or arcuate as shown in FIGURE 26.

It should be pointed out that the pocket-forming members 244 are formed of a relatively light springy material so that as the eggs drop into the pockets, they yield slightly to accommodate the egg and also cushion the fall of the egg. However, it should be pointed out that they are not so springy that the egg will pass on through between the pocket-forming members 244. The spring 245 are provided on the sides of the pocket-forming members 243 and also help to cushion the fall of the egg as it drops into the accumulator. This is particularly true when relatively large eggs are dropped into the accumulator. In the event the egg should drop into the accumulator slightly off center from the pocket, the springs 245 will yieldably urge the egg towards the center of the pocket so that it will be centrally disposed between the pocket-forming members 244. It also has been found that the springs 245 are very desirable in that they serve to prevent the eggs from striking each other sidewise and, therefore, serve to effectively eliminate the breaking of any eggs as they fall into the accumulator 232.

After the second egg has been discharged into the accumulator, the microswitch MS-2 will again be operated to energize the relay B-18. Energization of the relay B-18 as hereinbefore described causes a count to be registered on the counter 333 and also causes energization of the accumulator relay B-36. Energization of the accumulator relay B-36 causes rotation of the cam 301 and again causes movement of the accumulator arm 246 to the left as viewed in FIGURE 8.

Figure 22:
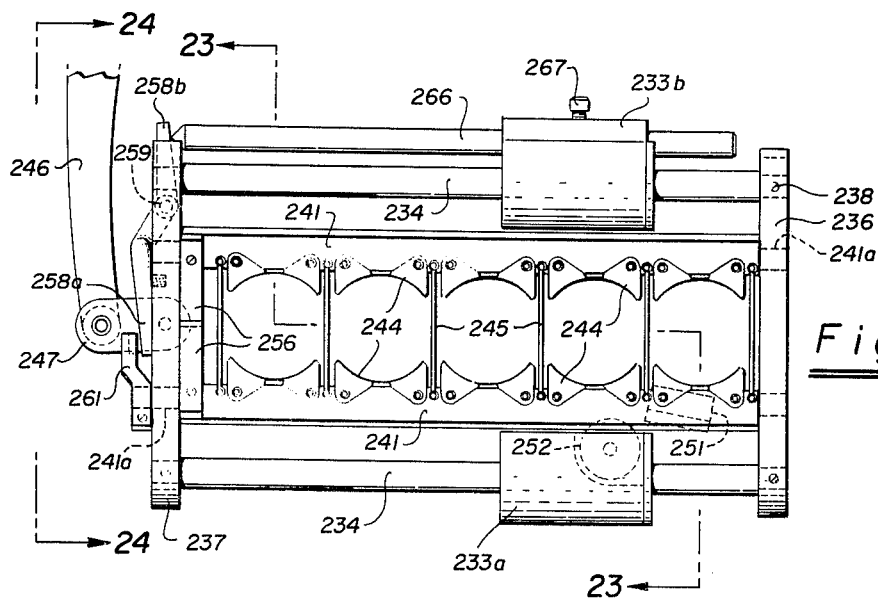
FIGURE 22 is a plan view of the accumulator similar to that shown in FIGURE 19 but showing it in the position just after the articles or eggs have been dropped by the accumulator or, in other words, in an article releasing position.

Now let it be assumed that the rod 266 has been positioned as shown in FIGURE 22 so that upon slight additional movement of the accumulator to the right as viewed in FIGURE 22, the lever 258 engages the rod 266 so as to release the pawl 261. Release of the pawl 261 permits the upper springs 245 to move the upper extremities of the bars 241 inwardly to tip or rotate the same as shown in FIGURE 22 against the force of the bottom springs 245. At the same time, the pocket-forming members 244 are moved to the egg or article releasing positions shown in FIGURE 23 to permit the eggs to drop directly into the row of pockets 351 formed in a container 352 on the conveyor 76. The container 252 is a carton of a conventional type which is provided with six rows of two pockets each. The carton is positioned so that the rows are advanced longitudinally of the stub conveyor 76 as hereinafter described so that the rows extend in a direction parallel to the path of travel of the scale beam assemblies 63.

The eggs are discharged by the accumulator 232 while the accumulator is in a substantially stationary position because the cam follower 307 is at its outermost point of travel with respect to the shaft 286 and is ready to return. Continued movement of the cam 301 permits the follower 307 to return towards the shaft 286 under the urging of the spring 318. This causes the shaft 313 to be rotated in a clockwise direction as viewed in FIGURE 8 and the outer end of the arm 246 secured thereto with the accumulator 232 to be shifted to the right as viewed in FIGURE 8. This movement continues until the accumulator 232 is returned to its home position shown in FIGURE 8 in which the first pocket of the accumulator, counting from the left as viewed in FIGURE 8, is positioned so that it is ready to receive the next egg discharged in the station. The cam 301 is stopped in the proper position by operation of the accumulator stop microswitch MS-5 by a raised portion 327a on the cam 327 which causes deenergization of the relay B-36, deenergization of the clutch magnet 284 and energization of the brake magnet 289.

At the time the accumulator 232 is being returned to its home position, the pocket-forming members 244 are also returned to egg or article retaining positions by the cam plate 251 coming into engagement with the roller 252. This causes the bars 241 to be rotated against the tension of the upper springs 245 so that the pawl 261 is moved upwardly and so that the portion 258a of the lever 258 can again move into the recess 261a under the force of the spring 263 to thereby again latch the pocket-forming members 244 into egg or article retaining positions.

It should be pointed out that the stub conveyor 76 associated with the commercial station 67 is advanced as soon as the eggs have been dropped from the accumulator 232 into the carton or container 252 beneath the accumulator and carried by the conveyor 76. This is accomplished by energization of the relay B-50 which can be called the conveyor relay. This relay is energized as soon as the microswitch MS-6 is operated. The microswitch MS-6 is operated by the cam 329 which is carried by the armature hub 291. The raised portions 329a provided on the cam 329 are positioned in such a manner that the microswitch MS-6 is operated as soon as a row of eggs have been dropped by the accumulator and deposited in the container or carton 252. It can be seen from the circuit diagram in FIGURE 33 that closing of the normally open microswitch MS-6 establishes a circuit for energization of the winding of relay B-50 through the contacts 1 and 2 of relay B-36. By the time that the microswitch MS-6 is operated, the accumulator relay B-36 has already been energized in a manner as hereinbefore described.

Energization of the relay B-50 opens its contacts 5 and 6 which deenergizes the clutch magnet for the brake and clutch assembly 99. Energization of the relay B-50 closes its contacts 4 and 5 which energizes the clutch magnet of the brake and clutch assembly 98. A holding circuit for the relay B-50 is established through its contacts 1 and 2 and through the normally closed contacts of microswitch MS-1. Energization of the clutch magnet of the brake and clutch unit 98 causes the chain 96 to be driven. Movement of chain 96 causes the index or conveyor chain 91 to be advanced and the pushers 95 carried thereby cause the cartons disposed between the rails 126 to be advanced. Advancement continues until the microswitch MS-1 is operated by the cam surface 103 with which it is in engagement. As herinbefore explained, the cam surfaces 103 are provided with raised portions 103a in accordance with the particular type of cartons and trays being utilized on the conveyor. The raised portions 103a are dimensioned so that the cartons will be advanced exactly in accordance with the spacing between the pockets in the individual cartons and the spacing between cartons so that the next row of pockets will underlie the accumulator 232.

Energization of the microswitch MS-1 opens the holding circuit for the relay B-50. Deenergization of the relay B-50 deenergizes the clutch magnet for the brake and clutch assembly 98 and energizes the brake magnet of the brake and clutch assembly 98 to stop the travel of the index conveyor chain 91 so that the next row of pockets in the carton immediately underlies the accumulator 232.

As additional eggs of the same grade pass into the commercial station 67, it can be seen that the first egg will be deposited in the first pocket of the accumulator 232, the second egg in the second pocket of the accumulator 232, and thereafter the two eggs accumulated will be released from the accumulator into the next row of pockets in the carton 252, after which the accumulator will be returned to its home position and the index conveyor 91 advanced to advance the next row of pockets in the carton so that they underlie the accumulator. This procedure continues until the carton is completely filled. Thereafter, the next carton is advanced so that the first row of pockets in the carton underlies the accumulator. As hereinbefore explained, the raised portions 103a on the associated cam surfaces 103 are such to take into account the difference in spacing between the last pocket of the preceding carton and the first pocket of the succeeding carton so that at all times a row of pockets of a carton always underlies the accumulator 232.

It should be pointed out that the dropping of the eggs from the accumulator 232 directly into the carton has significant advantages. The eggs are dropped from the accumulator while it is substantially stationary and thus are permitted to fall in a straight line into the pockets of the cartons. Since this is the case, it is possible to more accurately position the eggs in the cartons so that the eggs will always drop into the center of the pockets provided in the cartons to thereby greatly minimize any opportunity for the eggs to accidentally bump into each other and thereby crack or break the shells of the eggs.

Now let it be assumed that instead of placing the eggs in cartons 352, it is desired to place the eggs in trays 361 of a conventional type such as those which have six rows of five pockets each. First, in the front of the machine, the rod 266 is adjusted by retracting the same from the position shown in FIGURE 22 to the position as shown in FIGURE 28 and then tightening the set screw 267. Then, in the rear of the machine, the accumulator switch arm 321 is shifted to the left as viewed in FIGURES 9 and 18 to move the microswitches MS-5 and MS-6 out of engagement with their respective cams and to move the microswitches MS-3 and MS-4 into engagement with their associated cams. Also in the rear of the machine, the lever arm 106 is raised and then shifted laterally on the rod 107 until the microswitch MS-1 is in engagement with the cam surface 103 which has raised portions 103a on it which correspond to the spacing between the pockets 362 in the trays 361. The lever arm 106 is then released to permit the spring 109 to yieldably urge the operating arm 104 of the microswitch MS-1 into engagement with the cam surface 103 and to seat within the correct notch 117 in the plate 116. Also, the shaft 308 is pushed downwardly by grasping the knurled knob 308a so that the cam follower 307 will engage the five-drop cam 302 instead of the two-drop cam 301 as shown in FIGURE 7.

After these adjustments have been made, the apparatus is again ready for operation. The arm 246 is shifted to the right as viewed in FIGURE 8 against the force of the spring 318. The first egg for the commercial station is discharged in the first pocket of the accumulator 232 by engagement of the latch arm with the unlatching member 186. Immediately thereafter, the microswitch MS-2 is operated to energize the relay B-18 to apply a count to the counter 333 and to energize the accumulator relay B-36. Energization of the accumulator relay as hereinbefore described causes rotation of the shaft 286 to cause rotation of the cam 302 to thereby cause the accumulator 232 to be shifted to the right as viewed in FIGURE 27. Shifting to the right is halted when the microswitch MS-3 is operated by the cam 326 by deenergizing the accumulator relay B-36, as hereinbefore described. The next scale beam assembly which carries an egg for the commercial station 67 is then discharged into the second pocket of the accumulator 232. The accumulator is then advanced to the right as viewed in FIGURE 27 to place the third pocket of the accumulator in an egg receiving position in a manner similar to that hereinbefore described. This procedure continues until the fifth egg is dropped in the fifth pocket as shown in FIGURE 27. It will be noted that the eggs in each station are discharged at only one point in the station as determined by the position of the unlatching lever.

Immediately after the fifth egg has been dropped into the accumulator 232, the microswitch MS-2 is again operated by the wheel 151 of the associated scale beam assembly to again cause energization of the relays B-18 and B-36, as hereinbefore described. Energization of the relay B-36 again causes rotation of the shaft 286 and the cam 302. Continued rotation of the cam 302 causes the accumulator 232 to be shifted slightly to the right so that the rod 266 engages the operating lever 258 to release the pawl 261. Release of the pawl 261 permits the pocket-forming members 243 to move to an article releasing or egg releasing position as hereinbefore described to drop all the five eggs in unison into the row of pockets of the tray below to fill one complete row of the tray. Continued rotation of the cam 302 now permits the cam follower 307 to move in closer towards the shaft 286 under action of the spring 318 and to return the accumulator 232 to its home position. In the home position, the first pocket in the accumulator, counting from the right-hand side, as viewed in FIGURE 27, is placed in a position so that it will receive the next egg or article which is discharged in the station.

As pointed out previously, when the accumulator 232 is returned to its home position, the pocket-forming members 243 are restored to article retaining positions when the cam plate 251 engages the roller 252. The pocket-forming members 243 are latched in this egg retaining position by the lever arm 258 seating within the notch 261a of the pawl 261 after the free end of the pawl 261 has been raised by rotation of the bars 241 by the cam plate 251.

After a row of eggs or articles have been discharged into a row of pickets in the tray 361, rotation of the shaft 286 causes rotation of the cam 328 to cause operation of the microswitch MS-4. Operation of the microswitch MS-4 closes a circuit for energzing the conveyor relay B-50 through contacts 1 and 2 of the accumulator relay B-36. This causes deenergization of the brake magnet and energization of the clutch magnet to cause the chain 91 to be driven to advance the pushers 95 and to thereby advance the tray 361 so that another row of pockets will immediately underlie the accumulator 232. The advancement of the tray is halted at the proper time by the operation of the microswitch MS-1 by the associated cam surface 103 to cause deenergization of the relay B-50. The accumulator is now in a position to receive the next five eggs and to thereafter discharge the five eggs in unison into the next row of pockets of the tray below, after which the tray is again advanced to present the next row of pockets so that they underlie the accumulator.

From the foregoing, it can be seen that our apparatus can be readily adjusted so that the accumulator 232 will accumulate a sufficient number of eggs to fill a complete row of pockets in the container in which the articles or eggs are being packed. After the proper number of eggs have been accumulated, they are dropped directly in unison into the pockets of the tray below. It can be seen that the cams 301 and 302 are formed so that cam 301 provides three cycles of two drops for each complete revolution of the cam, whereas cam 302 only provides one cycle of five drops for each revolution of the cam.

The operation of our apparatus in the other commercial station 68 is identical to that hereinbefore described for station 67. In the weight stations 69, 70, 71, 72 and 73, the operation is slightly different because in place of the microswitch MS-2, it has been found desirable to utilize the photoelectric means hereinbefore described. It has been found that it is desirable to utilize photoelectric means in the weight stations in order to achieve long term reliability because of the great number of operations which would be required of the microswitches if microswitches were utilized in place of the photoelectric means for energizing the relay B-18.

The scale beam assemblies, after they have passed through the commercial stations, pass into a different section of cam track 152. As can be seen from FIGURE 9, the cam track is inclined upwardly and the straps 153 and 154 forming the cam track are spaced apart so that there is room for substantial vertical movement of the wheels 151. Thereafter, it is noted that the cam track 152 slopes downwardly. This is because the articles having the greater weight are weighed first and since those articles of greater weight will be discharged, only articles of lesser weight will remain and, therefore, the cam track can inclined downwardly. In the portion of the track 152 after the commercial stations, all of the scale beam assemblies having heavier articles will tend to assume a balance position in accordance with the weight of the article carried by the scale beam assembly 63 as described in our copending application Serial No. 89,275, filed February 14, 1961. As hereinbefore explained, slicer bars 168 are provided in each of the weight stations. If the weight of the article in the scale beam assembly is such that the knife edge 170 carried by the scale beam assembly travels above the pointed or tapered portion, the rear end of the scale beam assembly 63 will be urged upwardly so that the wheel 151 travels adjacent the strap 153 forming the cam track.

Thus, assuming that the first weight station is the jumbo station, the scale beam assembly will be unlatched by the latch arm 148 engaging the unlatching member 187 to discharge the egg into the first pocket of the accumulator 232 in that station. The member 187 is adjusted laterally and is also positioned according to height in a manner hereinbefore described so that the unlatching member 187 will be engaged by the latch arms 148 carried by the scale beam assemblies which have their knife edges 170 pass over the slicer bar 168 in that station as shown in FIGURE 12.

The unlatching member 187 is positioned in each of the stations so that shortly after the egg or article has been released by a scale beam assembly in that station, the wheel 151 will interrupt the light from the lamp 171 to the photocell 173. This causes a signal to be generated through the amplifier 336 to energize the relay B-18. Energization of the relay B-18 causes a count to be supplied to the counter 333 and also causes operation of the accumulator relay B-36. Relay B-36 operates in the same manner as hereinbefore described to advance the accumulator 232 to a position so that the second pocket in the accumulator is in a position to receive the second egg discharged in that station. The remaining sequence of operation is similar to that hereinbefore described for the commercial stations, the operation, of course, differing depending on whether it is desired to accumulate two eggs or five eggs, or a different number, as hereinbefore described.

For the jumbo eggs, when packing them more than two in a row, it has been found necessary to increase the spacing between the pockets to accommodate the eggs. Thus, for example, it has been found instead of placing five eggs in a row, it is desirable to only place four eggs in a row. To do this, it is necessary to slightly modify the accumulator so that the pocket-forming members 243 are slightly larger. It is also necessary to provide a different cam 306 which is substituted for the cam 302 so that the accumulator is properly positioned to receive the eggs which are discharged in the jumbo station.

The operation in the other weight stations is substantially identical to that hereinbefore described for the jumbo station and the commercial stations, the primary difference being that the relay B-18 is energized by the cutting off of the light from the photocell 173 rather than operation of a microswitch MS-2.

In the peewee station, it has been found desirable to position the lamp 171 and the photocell 173 in such a position that an egg being released from the article carrying device will interrupt the light beam to the photocell to again cause the relay B-18 to be energized to cause a sequence of operation identical to that hereinbefore described. To accomplish this, the photoelectric means is mounted on the casting 233 carrying the accumulator 232 so that the light from the lamps 171 shines across the accumulator at the point the egg or article is to be dropped into the empty pocket below. Thus, it can be seen that the photoelectric sensing means can be placed in a number of locations and still accomplish the desired result, that is, counting every egg discharged in the station and then causing the accumulator to be shifted in the proper manner which, in turn, will cause the cartons or trays in which the eggs are being packed to be properly advanced.

Although in the apparatus hereinbefore described, the eggs or articles have been deposited in the accumulator 232 in a direction which is countercurrent to the direction of travel of the scale beam assemblies, it is readily apparent that the accumulator 232 can be so arranged and operated so that the eggs are deposited in the accumulator in a direction which is concurrent with the direction of travel of the scale beam assemblies. Such an embodiment is shown in FIGURE 32. As can be seen, this embodiment is a mirror image of the embodiment shown in FIGURE 8. The first egg which is discharged from the scale beam assembly is deposited in the first pocket numbering from the left as viewed in FIGURE 2. The accumulator 232 is then shifted to the left so that the second pocket numbering from the left is in a position to receive the second egg discharged in the station. The second, third, fourth and fifth eggs are, therefore, deposited in the accumulator 232 in a direction which is concurrent with the direction of travel of the conveyor. As soon as two eggs or five eggs have been deposited in the accumulator, all of the eggs can be dropped in unison into the carton or tray below to fill a complete row in the carton or tray. Thereafter, the accumulator is returned to its home position which is shown in FIGURE 32.

In each of the embodiments means has been provided for compensating for the changes in trajectory of the eggs because of changes in the speed of travel of the article carrying devices or scale beam assemblies 63. As hereinbefore explained, this is accomplished by the linkage which is connected to the hand wheel 206. The linkage is utilized for positioning the unlatching members 186 and 187 in the various stations so that the discharge of the eggs from the scale beam assemblies is advanced or retarded depending upon whether the speed of travel of the scale beam assemblies is increased or decreased. The wheel 206, in addition to controlling the positioning of the linkage, actually controls the speed of the variable speed drive motor 54 through the potentiometer 213 which is connected thereto. The hand wheel 206 makes it possible for the operator at the candling station to greatly vary the speed of travel of the scale beam assemblies by mere rotation of the wheel 206 without adversely affecting the placement of the eggs in the accumulator as they are discharged on the scale beam assemblies because at the same time that the speed of the motor is being varied, the positioning of the unlatching members 186 and 187 is also being varied.

It is apparent from the foregoing that we have provided a new and improved handling, sorting and packing apparatus which is particularly adapted for use with fragile articles such as eggs. Means has been provided on the apparatus for accommodating the differences in trajectories of the eggs because of changes in speed of the transport or conveyor means carrying the eggs. Because of this means for compensating for the change in speed of the scale beam assemblies, the eggs are always deposited in the center of the pockets formed by the pocket receiving members in the accumulator 232. This, as explained previously, greatly reduces or, for all practical purposes, eliminates cracking or breaking of the shells of the eggs. After the eggs have been precisely positioned in the accumulators, they are precisely dropped in unison into the pockets of the cartons or trays below to fill complete rows of pockets. The apparatus is constructed in such a manner that it can be readily shifted for packing eggs in rows with any number of eggs from two to five eggs. If desired, relatively simple modifications can be made to increase the capacity of the accumulator so that greater numbers of eggs can be accumulated.

It is also apparent from the foregoing that we have provided apparatus which is relatively simple to operate and which can be readily controlled by an operator.

We claim:

1. In apparatus for handling eggs, frame means forming commercial stations and weight stations, means including individual egg carrying devices for transporting eggs with the same axes lying in parallel vertical planes along a path in one direction through the commercial stations and weight stations, the egg carrying devices being capable of assuming egg carrying and egg releasing conditions, each of the egg carrying devices including means for weighing the eggs carried thereby, each of the egg carrying devices being capable of assuming a position determined by the weight of the egg carried by the device, a candling station means in the candling station for causing the egg carrying devices to assume a lateral position in accordance with the grade of egg carried by the device, means mounted in the commercial stations for causing the egg carrying devices in a predetermined lateral position to assume an egg releasing condition in a predetermined station, means in each of the weight stations for causing each of the egg carrying devices having eggs therein corresponding to the weight of eggs to be discharged in the station to assume an egg releasing condition while passing through the station so that the egg in the device is discharged to fall by gravity in the station, an accumulator having egg receiving pockets mounted in each station and underlying the path of the egg carrying devices and receiving eggs from the egg carrying devices and retaining the eggs with their same axes lying in parallel vertical planes, means for shifting the accumulator in each station, said means for shifting said accumulator in each station including means for counting each egg which is released in the station, and means for causing each accumulator in each station to release the eggs it has received after it has accumulated a predetermined number of eggs.

2. Apparatus as in claim 1 wherein said means for causing the egg carrying devices to assume egg releasing conditions in the commercial and weight stations include means for causing the eggs to be released at a predetermined point in each of the stations.

3. Apparatus as in claim 1 together with means for adjusting the position of the means in each station for causing the egg carrying devices to assume an egg releasing position in accordance with the speed of the egg carrying devices to thereby compensate for changes in the trajectories of the eggs as they are dropped from the egg carrying devices.

4. Apparatus as in claim 1 together with conveyor means mounted in each of the stations, the conveyor means adapted to have containers supplied thereto, the conveyor means including means for advancing the containers into a position below the accumulator in each station so that the eggs are received with their same axes in a vertical position, and means for advancing the container each time eggs are deposited in the container from the accumulator.

5. In apparatus for handling articles, means including individual article carrying devices for transporting articles along a predetermined path, the individual article carrying devices being capable of assuming article carrying and article releasing conditions, accumulator means for receiving articles from the means for transporting articles means for shifting the position of said accumulator means relative to said means for transporting articles, means for causing discharge of articles from the individual article carrying devices into the accumulator means, and means for causing said accumulator means to discharge articles it has received, said individual article carrying devices moving continuously and said accumulator means remaining stationary during the time each article is being deposited in the accumulator means, said means for causing discharge of articles from the individual article carrying devices including means for compensating for changes in the trajectories of the articles upon discharge due to changes in speed of travel of the individual article carrying devices.

6. In apparatus for handling articles, means including individual article carrying devices for transporting articles along a predetermined path, the article carrying devices being capable of assuming article carrying and article releasing conditions, an accumulator having pockets movable as a unit for receiving articles from the article carrying devices, said pockets in said accumulator being disposed solely in a horizontal plane, a portion of said predetermined path overlying said accumulator and being disposed in a plane parallel to the horizontal plane of the pockets in the accumulator, said article carrying devices serving to carry said articles with their corresponding axes in vertical planes while traveling in said portion of the predetermined path, means for causing said article carrying devices to release the articles carried by the article carrying devices while the article carrying devices are traveling in said portion of said predetermined path to permit the articles to fall by gravity therefrom and directly into the pockets in the accumulators so that the corresponding axes of said articles are disposed in vertical planes in the pockets in the accumulator as in the article carrying devices, said means for causing said article carrying devices to release the articles including means for compensating for changes in the trajectories of the articles upon release due to changes in speed of travel of the individual article carrying devices and means for causing said accumulator to discharge articles received in the pockets.

7. In apparatus for handling eggs, means including individual egg carrying devices for transporting eggs along a predetermined path in one direction, the egg carrying devices being capable of assuming egg carrying and egg releasing conditions, an accumulator having egg receiving pockets lying solely in a substantially horizontal plane, a portion of said predetermined path overlying said accumulator and lying in a horizontal plane parallel to the horizontal plane in which the egg receiving pockets lie, said egg carrying devices serving to carry said eggs so that the corresponding elongated axes of said eggs lie in vertical planes, means positioned in the parth of the egg carrying devices for causing certain of the egg carrying devices to assume egg releasing conditions in said portion of said path to permit the eggs to be released therefrom and to fall by gravity directly into the egg receiving pockets with the corresponding elongated axes of the eggs being disposed in vertical planes, means for shifting the accumulator in a direction which is parallel to said portion of the path of the egg carrying devices, said means for shifting said accumulator including means for counting each egg which is released in said predetermined location and thereafter shifting the accumulator to receive the next egg discharged in the predetermined location, and means for causing said accumulator to release the eggs it has received after it has accumulated a predetermined number of eggs.

8. Apparatus as in claim 7 together with means for causing said means including individual egg carrying devices for transporting eggs to move continuously at an adjustable speed and wherein the means for causing certain of the egg carrying devices to assume an egg releasing condition includes means for shifting the point at which the egg carrying devices are caused to assume an egg releasing condition to compensate for the speed of travel of the egg carrying devices.

9. In apparatus for handling articles, means including individual article carrying devices for transporting articles along a path in one direction with the same axes of the articles lying in vertical parallel planes, the article carrying devices being capable of assuming article carrying and article releasing conditions, means for causing certain of said article carrying devices to assume an article releasing condition at a predetermined location so that articles fall by gravity and are discharged at said predetermined location, an accumulator having a plurality of article receiving pockets, said accumulator underlying the path of travel of the article carrying devices and having its first pocket underlying said predetermined location so that the first article discharged at said predetermined location will be received in said first pocket with its same axis lying in a vertical plane, means for counting the articles discharged in said predetermined location, means actuated by said counting means for shifting the accumulator to sequentially position the next pocket of the accumulator at said predetermined location so that the next article discharged at said predetermined location will be received in said pocket, and means for causing said accumulator to discharge the articles it has received after it has accumulated a predetermined number of articles, said accumulator consisting of a frame, a pair of spaced parallel elongate members rockably mounted in said frame, a plurality of pocket forming members mounted on each of said elongate members to form a plurality of pockets disposed between the elongate members and extending longitudinally of the elongate members, and means for urging the pocket forming members into article retaining positions, said means for shifting the accumulator including a cam, a cam follower engaging the cam, an arm connected to the cam follower and to the accumulator, yieldable means connected to the cam follower and yieldably urging the cam follower into engagement with the cam, motive means for driving the cam, said motive means being actuated by said counting means to cause movement of the cam follower and the arm and the accumulator connected thereto against the force of the yieldable means, and cam operated switch means operated by said motive means for deenergizing the motive means to stop the accumulator at a predetermined position.

10. Apparatus as in claim 9 together with a conveyor underlying the accumulator for advancing containers having rows of article receiving pockets therein to successive positions beneath the accumulator so that articles discharged by the accumulator are received in rows in the container with the same axes of the articles lying in vertical planes, said conveyor including motive means for driving the conveyor, cam operated switch means operated by said first named motive means for starting said motive means for driving the conveyor, and additional cam operated switch means operated by the motive means for driving the conveyor for deenergizing the motive means for driving the conveyor.

11. In apparatus for handling articles, means including individual article carrying devices for transporting articles along a path in one direction with the same axes of the articles lying in vertical parallel planes, the article carrying devices being capable of assuming article carrying and article releasing conditions, means for causing certain of said article carrying devices to assume an article releasing condition at a predetermined location so that the articles fall by gravity and are discharged at said predetermined location, an accumulator having a plurality of article receiving pockets, said accumulator underlying the path of travel of the article carrying devices and having its first pocket underlying said predetermined location so that the first article discharged at said predetermined location will be received in said pocket with its same axis lying in a vertical plane, means for counting the article discharged in said predetermined location, means actuated by said counting means for shifting the accumulator to sequentially position the next pocket of the accumulator at said predetermined location so that the next article discharged at said predetermined location will be received in said pocket and means for causing said accumulator to discharge the articles it has received after it has accumulated a predetermined number of articles, said accumulator consisting of a frame, said frame being comprised of a pair of spaced parallel rods and a pair of transverse members secured to the ends of the rods together with means for supporting said rods, said means including a bracket, said rods being slidably mounted in said bracket, said accumulator comprising a pair of spaced parallel elongate members rockably mounted in said frame, a plurality of pocket forming members mounted on each of said elongate members to form a plurality of pockets disposed between the elongate members and extending longitudinally of the elongate members, and means for urging the pocket forming members into article retaining positions.

12. In apparatus for handling articles, means including individual article carrying devices for transporting articles along a path in one direction with the same axes lying in vertical parallel planes, the article carrying devices being capable of assuming article carrying and article releasing conditions, means for causing certain of said article carrying devices to assume an article releasing condition at a predetermined location so that articles fall by gravity and are discharged at said predetermined location, an accumulator having a plurality of article receiving pockets, said accumulator underlying the path of travel of the article carrying devices and having its first pocket underlying said predetermined location so that the first article discharged at said predetermined location will be received in said first pocket with its same axis lying in a vertical plane, means for counting the articles discharged in said predetermined location, means actuated by said counting means for shifting the accumulator to sequentially position the next pocket of the accumulator at said predetermined location so that the next article discharged at said predetermined location will be received in said pocket, and means for causing said accumulator to discharge the articles it has received after it has accumulated a predetermined number of articles, said accumulator consisting of a frame, a pair of spaced parallel elongate members rockably mounted in said frame, a plurality of pocket forming members mounted in each of said elongate members to form a plurality of pockets disposed between the elongate members and extending longitudinally of the elongate members, and means for urging pocket forming members into article retaining positions, said means for causing said accumulator to discharge articles it has received after it has accumulated a predetermined number of articles including a pawl secured to one of said elongate members, a lever arm mounted on said frame and adapted to engage said pawl, means connecting said elongate members for conjoint movement of the same, yieldable means urging said lever into engagement with said pawl, said lever when in engagement with said pawl serving to retain said pocket forming members in article retaining positions, and a rod-like member adjustably positioned on said bracket and adapted to be engaged by said lever as said accumulator is shifted in said bracket to move said lever out of engagement with said pawl to thereby permit said pocket-forming members to move to article releasing positions.

13. Apparatus as in claim 12 together with cam means mounted on one of said elongate members and means mounted on said bracket and engaged by said cam means when said accumulator is returned to its initial or home position to move the elongate members and the pocket-forming members secured thereto against the force of the yieldable means into article retaining positions and also so that the lever can be moved into engagement with the pawl by the last named yieldable means to thereby latch the pocket-forming members into article retaining positions.

14. In apparatus for handling articles, means for transporting articles along a path, accumulator means for receiving articles from the means for transporting articles, said accumulator means comprising a frame, a pair of spaced parallel elongate members rockably mounted in said frame, a plurality of pocket forming members mounted in each of said elongate members, spring-like members secured to said elongate members and being disposed on opposite sides of each of said pocket-forming members so that the spring-like members and the pocket forming members form a plurality of pockets extending in a direction longitudinally of the elongate members in which the pocket forming members form two opposing sides of each pocket and the spring-like members form two opposing sides of the same pocket at substantially right angles to the sides formed by the pocket forming members, means for urging the pocket forming members into article retaining positions, means for causing the discharge of articles from the means for transporting the articles to permit the articles to drop into the accumulator means, said spring-like members being positioned so as to retard the movement of the articles into the pocket forming members and means for causing said accumulator means to discharge articles it has received.

15. Apparatus as in claim 14 in which spring-like members are mounted on the upper and lower portions of the elongate members and in which the spring-like members secured to the upper portions of the elongate members serve to yieldably urge the pocket forming members toward article releasing positions.

16. In apparatus for handling articles, means for transporting articles along a path, accumulator means for receiving articles from the means for transporting articles, said accumulator means comprising a frame having a pair of spaced parallel rods and a pair of transverse members secured to the ends of the rods together with means for supporting the rods, said last named means including a bracket, said rods being slidably mounted in said bracket, a pair of spaced parallel elongate members rockably mounted in said transverse members, a plurality of pocket forming members mounted in each of said elongate members to form a plurality of pockets disposed between the elongate members and extending longitudinally of the elongate members, means urging the pocket forming members into article retaining positions, means for causing the discharge of articles from the means for transporting the articles into the accumulator means, and means for causing said accumulator means to discharge articles it has received.

References Cited by the Examiner
UNITED STATES PATENTS

| | | | |
|---|---|---|---|
| 1,033,219 | 7/1912 | Wall | 209—115 |
| 1,983,892 | 12/1934 | Barton | 209—121 X |
| 2,160,319 | 5/1939 | Schwartz | 209—121 |
| 2,730,279 | 1/1956 | Enock | 53—166 |
| 2,895,274 | 7/1959 | Mumma | 209—121 |

M. HENSON WOOD, JR., *Primary Examiner.*

CLAUSE A. LEROY, ROBERT B. REEVES, *Examiners.*